(12) United States Patent
Lee et al.

(10) Patent No.: US 11,917,669 B2
(45) Date of Patent: Feb. 27, 2024

(54) METHOD AND APPARATUS FOR TRANSMITTING AND RECEIVING SIGNAL FOR COOPERATIVE TRANSMISSION IN COMMUNICATION SYSTEM

(71) Applicant: ELECTRONICS AND TELECOMMUNICATIONS RESEARCH INSTITUTE, Daejeon (KR)

(72) Inventors: Yu Ro Lee, Daejeon (KR); Chang Wahn Yu, Daejeon (KR); Heesoo Lee, Daejeon (KR); Seung Eun Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 17/511,140

(22) Filed: Oct. 26, 2021

(65) Prior Publication Data

US 2022/0150903 A1    May 12, 2022

(30) Foreign Application Priority Data

Nov. 6, 2020  (KR) .................. 10-2020-0148145
Oct. 12, 2021 (KR) .................. 10-2021-0135232

(51) Int. Cl.
*H04W 72/04* (2023.01)
*H04W 72/542* (2023.01)
*H04W 72/044* (2023.01)

(52) U.S. Cl.
CPC ....... *H04W 72/542* (2023.01); *H04W 72/046* (2013.01)

(58) Field of Classification Search
CPC . H04W 72/542; H04W 72/046; H04W 36/32; H04W 36/08; H04W 36/0094;
(Continued)

(56) References Cited

U.S. PATENT DOCUMENTS 10,057,025 B2   8/2018  Park et al.
10,064,183 B2   8/2018  Moon et al.
(Continued)

FOREIGN PATENT DOCUMENTS

WO    2020/222604 A1    11/2020

OTHER PUBLICATIONS

Shaozhen Guo et al., "Dynamic TDD and Interference Management towards 5G", 2018 IEEE Wireless Communications and Networking Conference (WCNC).

*Primary Examiner* — Anez C Ebrahim
(74) *Attorney, Agent, or Firm* — LRK PATENT LAW FIRM

(57) ABSTRACT

An operation method performed by a terminal in a communication system may include: receiving, from a TRP, a first discovery signal including an identifier of a first transmission beam by using a first reception beam; measuring a first received signal strength of the first discovery signal; receiving, from the TRP, a second discovery signal including an identifier of a second transmission beam by using a second reception beam; measuring a second received signal strength of the second discovery signal; transmitting, to the TRP, first beam pair information including the identifier of the first transmission beam and an identifier of the first reception and the first received signal strength information; and transmitting, to the TRP, second beam pair information including the identifier of the second transmission beam and an identifier of the second reception beam and the second received signal strength information.

10 Claims, 13 Drawing Sheets

(58) Field of Classification Search
CPC ....... H04W 36/03; H04B 7/063; H04B 7/024; H04B 7/0695; H04B 7/0408; H04B 7/0617; H04B 7/04
See application file for complete search history.

(56) References Cited

U.S. PATENT DOCUMENTS

| | | |
|---|---|---|
| 10,292,139 B2 | 5/2019 | Yu et al. |
| 2014/0161059 A1 | 6/2014 | Lee et al. |
| 2017/0215117 A1* | 7/2017 | Kwon ................... H04W 36/32 |
| 2019/0123801 A1 | 4/2019 | Yum et al. |
| 2019/0165843 A1* | 5/2019 | Shang .................. H04B 7/0626 |
| 2019/0174346 A1 | 6/2019 | Murray et al. |
| 2021/0067224 A1* | 3/2021 | Yuan .................... H04B 7/0639 |
| 2022/0279367 A1* | 9/2022 | Hwang ................. H04L 5/0048 |

* cited by examiner

FIG. 4

| format | symbol number within a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | DL | DL | DL | DL | DL | DL | DL | DL | DL | DL | DL | DL | DL | DL |
| 1 | UL | UL | UL | UL | UL | UL | UL | UL | UL | UL | UL | UL | UL | UL |
| 2 | FL | FL | FL | FL | FL | FL | FL | FL | FL | FL | FL | FL | FL | FL |
| 3 | DL | DL | DL | DL | DL | DL | DL | DL | DL | DL | DL | DL | DL | FL |
| ⋮ | | | | | | | | | | | | | | |
| 30 | DL | DL | DL | DL | DL | DL | DL | DL | DL | DL | DL | FL | FL | FL | UL |
| 31 | DL | DL | DL | DL | DL | DL | DL | DL | DL | DL | DL | FL | UL | UL |
| ⋮ | | | | | | | | | | | | | | |
| 54 | FL | FL | FL | FL | FL | FL | FL | DL | DL | DL | DL | DL | DL | DL |
| 55 | DL | DL | FL | FL | FL | UL | UL | DL | DL | DL | DL | DL | DL | DL |
| 56-254 | reserved | | | | | | | | | | | | | |

DL downlink   UL uplink   FL flexible

METHOD AND APPARATUS FOR TRANSMITTING AND RECEIVING SIGNAL FOR COOPERATIVE TRANSMISSION IN COMMUNICATION SYSTEM

CROSS-REFERENCE TO RELATED APPLICATIONS

This application claims priority to Korean Patent Applications No. 10-2020-0148145, filed on Nov. 6, 2020, and No. 10-2021-0135232 filed on Oct. 12, 2021 with the Korean Intellectual Property Office (KIPO), the entire contents of which are hereby incorporated by reference.

BACKGROUND

1. Technical Field

The present disclosure relates to a technique for transmitting and receiving cooperative transmission signals in a communication system, and more particularly, to a technique for transmitting and receiving cooperative transmission signals in a communication system, which enables a plurality of transmission/reception points to transmit data to terminals without increase of interferences.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In order to process wireless data increasing rapidly after commercialization of the fourth generation (4G) communication system (e.g., long term evolution (LTE) communication system or LTE-Advanced (LTE-A) communication system), a fifth generation (5G) communication system (e.g., new radio (NR) communication system) using not only a frequency band (e.g., frequency band of 6 GHz or below) of the 4G communication system but also a frequency band (e.g., frequency band of 6 GHz or above) higher than the frequency band of the 4G communication system is being considered. The 5G communication system may support enhanced Mobile BroadBand (eMBB), Ultra-Reliable and Low Latency Communication (URLLC), and massive Machine Type Communication (mMTC).

Such the communication system may include a plurality of physically separated transceivers in order to increase a system capacity in a dense terminal environment. The plurality of physically separated transceivers may be referred to as a plurality of transmission/reception points (TRPs). In such the communication system in which a plurality of TRPs are physically separated, an output of a common oscillator may not be used, and thus a timing error between the respective TRPs may occur. Accordingly, in the communication system in which a plurality of TRPs are physically separated, performance degradation may occur due to additional overhead on radio channels for compensating for a frequency offset, increase in complexity for timing correction, and frequency estimation error. In addition, in such the communication system, the plurality of TRPs may need to transmit channel information between the TRPs and terminals to a controller. In addition, in such the communication system, the controller may need to transmit determined beam weights to the TRPs. To this end, in the communication system in which the TRPs are physically separated, many wired or wireless resources for communication between the TRPs and the controller may be required.

SUMMARY

Accordingly, exemplary embodiments of the present disclosure are directed to providing methods and apparatuses for transmitting and receiving cooperative transmission signals in a communication system, which enables a plurality of TRPs to perform downlink transmission and uplink reception without increase of interferences.

According to a first exemplary embodiment of the present disclosure, an operation method performed by a TRP in a communication system may comprise: transmitting, to a terminal, a first discovery signal including an identifier of a first transmission beam by using the first transmission beam; transmitting, to the terminal, a second discovery signal including an identifier of a second transmission beam by using the second transmission beam; receiving, from the terminal, first beam pair information including an identifier of a first reception beam used for receiving the first discovery signal and the identifier of the first transmission beam, and first received signal strength information of the first transmission beam; receiving, from the terminal, second beam pair information including an identifier of a second reception beam used for receiving the second discovery signal and the identifier of the second transmission beam, and second received signal strength information of the second transmission beam; transmitting, to a controller, the first beam pair information, the second beam pair information, the first received signal strength information, and the second received signal strength information; receiving, from the controller, information on a first transmission beam pair selected from the first beam pair information and the second beam pair information based on the first received signal strength information and the second received signal strength information; and transmitting data to the terminal by using a transmission beam according to the information on the first transmission beam pair.

The identifier of the first transmission beam may include a TRP identifier (ID) of the TRP and an index of the first transmission beam, the identifier of the second transmission beam may include the TRP ID of the TRP and an index of the second transmission beam, the identifier of the first reception beam may include a terminal ID of the terminal and an index of the first reception beam, and the identifier of the second reception beam may include the terminal ID of the terminal and an index of the second reception beam.

The operation method may further comprise: receiving, from another adjacent TRP, a third discovery signal including an identifier of a third transmission beam by using a third reception beam; obtaining third received signal strength information of the third discovery signal; transmitting, to the controller, third beam pair information including the identifier of the third transmission beam and an identifier of the third reception beam and the third receive signal strength information; receiving, from the controller, information on a second transmission beam pair selected from the first beam pair information and the second beam pair information based on the first received signal strength information, the second received signal strength information, the third received signal strength information, and the third beam pair information; and transmitting data to the terminal by using a transmission beam according to the second transmission beam pair.

The information on the second transmission beam pair may further include information on transmission directions of symbols, and in the transmitting of the data to the terminal by using the transmission beam according to the second transmission beam pair, the data may be transmitted to the terminal by using the transmission beam according to the second transmission beam pair according to the information on the transmission directions of symbols.

The operation method may further comprise: receiving, from the terminal, a feedback signal comprising an identifier of a fourth transmission beam by using a fourth reception beam; obtaining fourth received signal strength information of the feedback signal; transmitting, to the controller, fourth beam pair information including the identifier of the fourth transmission beam and an identifier of the fourth reception beam and the fourth received signal strength information; receiving, from the controller, information on a third transmission beam pair selected from the first beam pair information and the second beam pair information based on the first received signal strength information, the second received signal strength information, the fourth received signal strength information, and the fourth beam pair information; and transmitting data to the terminal by using a transmission beam according to the third transmission beam pair.

According to a second exemplary embodiment of the present disclosure, an operation method performed by a terminal in a communication system may comprise: receiving, from a TRP, a first discovery signal including an identifier of a first transmission beam by using a first reception beam; measuring a first received signal strength of the first discovery signal; receiving, from the TRP, a second discovery signal including an identifier of a second transmission beam by using a second reception beam; measuring a second received signal strength of the second discovery signal; transmitting, to the TRP, first beam pair information including the identifier of the first transmission beam and an identifier of the first reception and the first received signal strength information; and transmitting, to the TRP, second beam pair information including the identifier of the second transmission beam and an identifier of the second reception beam and the second received signal strength information.

The identifier of the first transmission beam may include a TRP identifier (ID) of the TRP and an index of the first transmission beam, the identifier of the second transmission beam may include the TRP ID of the TRP and an index of the second transmission beam, the identifier of the first reception beam may include a terminal ID of the terminal and an index of the first reception beam, and the identifier of the second reception beam may include the terminal ID of the terminal and an index of the second reception beam.

The operation method may further comprise receiving, from the TRP, data transmitted by using a transmission beam according to information on a first transmission beam pair selected from the first beam pair information and the second beam pair information based on the first received signal strength information and the second received signal strength information.

The operation method may further comprise: transmitting, to the TRP, a feedback signal including an identifier of a third transmission beam; and receiving, from the TRP, data transmitted by using a transmission beam according to a second transmission beam pair selected from the first beam pair information and the second beam pair information based on the first received signal strength information, the second received signal strength information, and third received signal strength information of the feedback signal.

According to a third exemplary embodiment of the present disclosure, a terminal may comprise: a processor; a memory electronically communicating with the processor; and instructions stored in the memory, wherein when executed by the processor, the instructions cause the terminal to: receive, from a TRP, a first discovery signal including an identifier of a first transmission beam by using a first reception beam; measure a first received signal strength of the first discovery signal; receive, from the TRP, a second discovery signal including an identifier of a second transmission beam by using a second reception beam; measure a second received signal strength of the second discovery signal; transmit, to the TRP, first beam pair information including the identifier of the first transmission beam and an identifier of the first reception and the first received signal strength information; and transmit, to the TRP, second beam pair information including the identifier of the second transmission beam and an identifier of the second reception beam and the second received signal strength information.

The identifier of the first transmission beam may include a TRP identifier (ID) of the TRP and an index of the first transmission beam, the identifier of the second transmission beam may include the TRP ID of the TRP and an index of the second transmission beam, the identifier of the first reception beam may include a terminal ID of the terminal and an index of the first reception beam, and the identifier of the second reception beam may include the terminal ID of the terminal and an index of the second reception beam.

The instructions may further cause the terminal to: receive, from the TRP, data transmitted by using a transmission beam according to information on a first transmission beam pair selected from the first beam pair information and the second beam pair information based on the first received signal strength information and the second received signal strength information.

The instructions may further cause the terminal to: transmit, to the TRP, a feedback signal including an identifier of a third transmission beam; and receive, from the TRP, data transmitted by using a transmission beam according to a second transmission beam pair selected from the first beam pair information and the second beam pair information based on the first received signal strength information, the second received signal strength information, and third received signal strength information of the feedback signal.

According to the exemplary embodiments of the present disclosure, a controller may determine transmission beams to be used by a plurality of TRPs in consideration of interferences between the plurality of TRPs and signal strengths between the plurality of TRPs and a terminal, thereby improving a transmission efficiency in a communication system where the plurality of TRPs are physically separated. In addition, the plurality of TRPs may perform downlink transmission and uplink reception without an increase in interferences, thereby improving performance of the communication system. Further, each TRP may receive beams transmitted by adjacent TRPs by using predetermined beams so as not to require calibration. In addition, each TRP may identify beams having large interferences among the beams transmitted by the adjacent TRPs, and deliver information on the identified beams to the controller so that interferences between the TRPs can be minimized in a dynamic time division duplex (TDD) operation. Further, each TRP may select a link capable of minimizing inter-terminal interference by measuring a strength of a transmission beam transmitted by the terminal, and using the measured strength of the transmission beam. In addition, the TRP may determine transmission directions of symbols in consideration of inter-TRP interference, thereby achieving the best communication quality.

BRIEF DESCRIPTION OF DRAWINGS

FIG. 4 is a structural diagram illustrating a first exemplary embodiment of a slot format in a communication system.

DETAILED DESCRIPTION OF THE EMBODIMENTS

Figure 1:
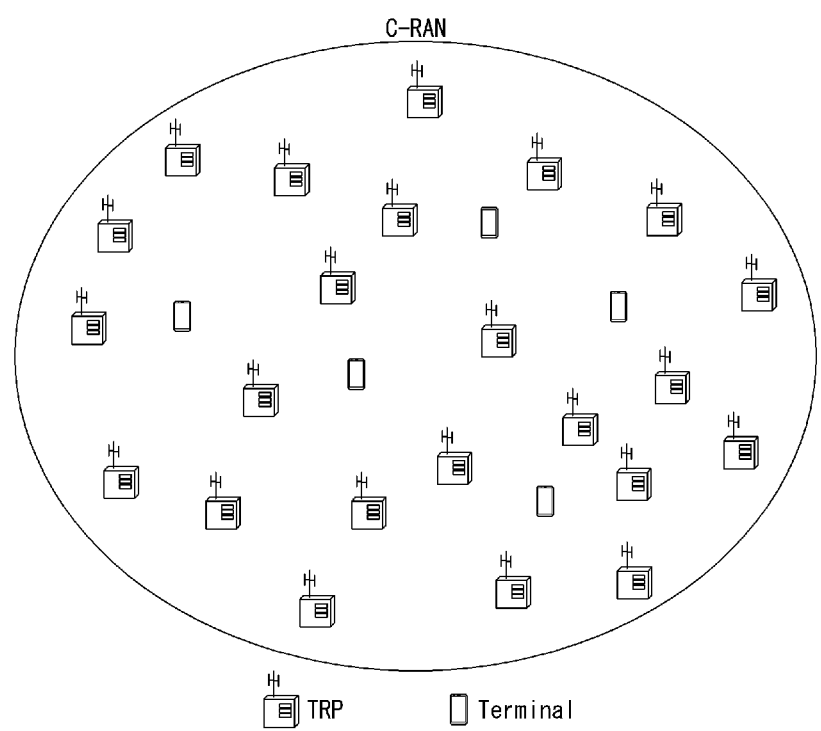
FIG. 1 is a conceptual diagram illustrating a first exemplary embodiment of an ultra-dense network (UDN) environment.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the present disclosure, a 'network' may include, for example, a wireless Internet such as Wi-Fi, a portable Internet such as wireless broadband internet (WiBro) or world interoperability for microwave access (WiMax), a $3^{rd}$ generation (3G) mobile communication network such as global system for mobile communication (GSM), code division multiple access (CDMA), or CDMA2000, a 3.5th generation (3.5G) mobile communication network such as high speed downlink packet access (HSDPA) or high speed uplink packet access (HSUPA), a $4^{th}$ generation (4G) mobile communication network such as long term evolution (LTE) or LTE-Advanced, a $5^{th}$ generation (5G) mobile communication network, and/or the like.

Throughout the present disclosure, a 'terminal' may refer to a mobile station, mobile terminal, subscriber station, portable subscriber station, user equipment, access terminal, and/or the like, and may include all or some functions of the terminal, mobile station, mobile terminal, subscriber station, portable subscriber station, user equipment, access terminal, and/or the like.

The terminal may refer to a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video player, or the like that has communication capability and that a mobile communication service user can use.

Throughout the present disclosure, a 'base station' may refer to an access point, radio access station, NodeB, evolved NodeB, base transceiver station, mobile multi-hop relay-base station (MMR-BS), and/or the like, and may include all or some functions of the base station, access point, wireless access station, NodeB, evolved NodeB, base transceiver station, MMR-BS, and/or the like.

Hereinafter, a 3GPP NR system as well as a 3GPP LTE/LTE-A system may be described as an example of a radio access system in which exemplary embodiments of the present disclosure are applicable. Hereinafter, in order to clarify the description of the present disclosure, the description is based on the 3GPP communication system (LTE, NR, etc.), but the technical spirit of the present disclosure is not limited thereto.

The following techniques may be used for various radio access communication systems such as code division multiple access (CDMA), frequency division multiple access (FDMA), time division multiple access (TDMA), orthogonal frequency division multiple access (OFDMA), and single carrier frequency division multiple access (SC-FDMA).

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of an ultra-dense network (UDN) environment.

Referring to FIG. 1, a plurality of transmission/reception points (TRPs) may be densely arranged around terminals in the UDN environment. A communication system may place the plurality of physically separated TRPs at a high density in order to increase a system capacity in a dense terminal environment. Each physically separate TRP may include one or more antennas.

The plurality of TRPs may be located at a very close distance of several meters to several tens of meters. The plurality of TRPs may be implemented in various forms, such as gNBs, radio remote heads (RRHs), or RRHs including some layer 1 (L1) functions. The plurality of TRPs may transmit and receive signals in cooperation to increase the capacity in the dense environment.

A recent communication system mainly considers a time division duplex (TDD) scheme capable of adjusting a ratio of downlink and uplink compared to a frequency division duplexing (FDD) scheme, in order to support efficient use of frequency bands and increasingly diversified services.

Meanwhile, in the UDN environment, a received signal strength at the TRP and the terminal may increase as a distance between the TRP and the terminal is closer. In addition, a strength of interference in the UDN environment may increase in proportion to the received signal strength at the TRP and the terminal. Accordingly, the system capacity in the UDN environment may not increase proportionally even when the number of TRPs increases.

Therefore, cooperative transmission in the UDN environment may be required to maximize a signal to interference plus noise ratio (SINR) by using channel information of all the TRPs. In particular, in the UDN environment, a cloud radio access network (C-RAN) structure may be considered mainly because there exist TRPs and a controller that determines beam weights of the respective TRPs for efficient cooperative transmission.

Figure 2:
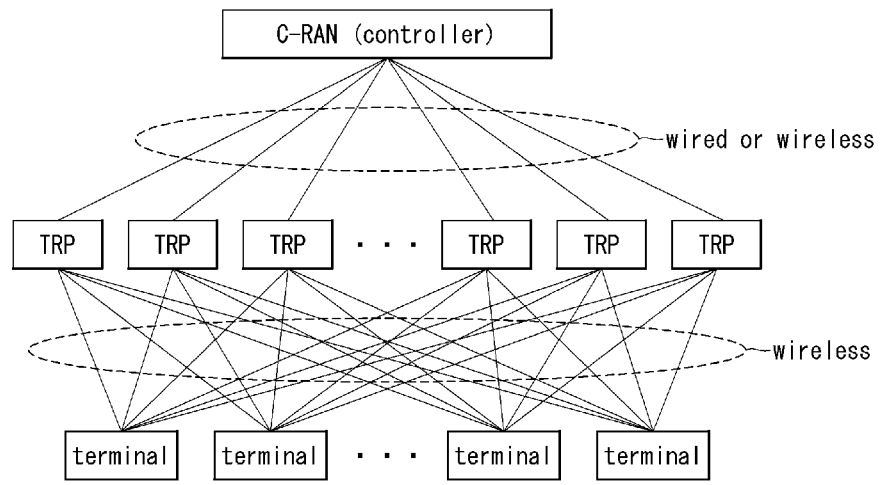
FIG. 2 is a conceptual diagram illustrating a first exemplary embodiment of a C-RAN structure.

FIG. 2 is a conceptual diagram illustrating a first exemplary embodiment of a C-RAN structure.

Referring to FIG. 2, in the C-RAN structure, a plurality of terminals may wirelessly transmit and receive signals with a plurality of TRPs, and the plurality of TRPs may be connected to one controller by wire or wirelessly. The C-RAN structure may require the controller capable of controlling the respective TRPs. The controller may be located in a cloud, or may be located independently between the TRPs and the cloud. Alternatively, one of the TRPs may serve as the controller.

Figure 3:
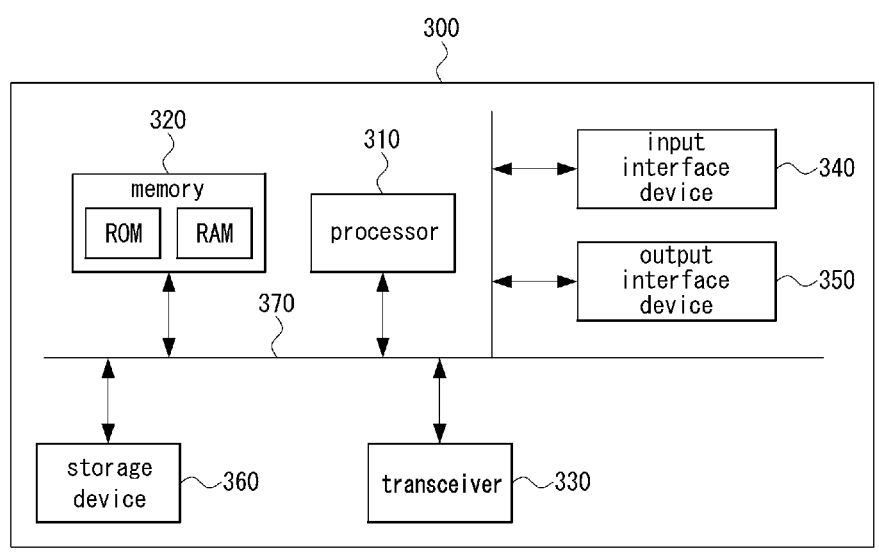
FIG. 3 is a block diagram illustrating a first exemplary embodiment of a communication node constituting a C-RAN structure.

FIG. 3 is a block diagram illustrating a first exemplary embodiment of a communication node constituting a C-RAN structure.

Referring to FIG. 3, a communication node 300 constituting the C-RAN structure, each of the TRP, terminal, and controller, may comprise at least one processor 310, a memory 320, and a transceiver 330 connected to the network for performing communications. Also, the communication node 300 may further comprise an input interface device 340, an output interface device 350, a storage device 360, and the like.

The respective components included in the communication node 300 may communicate with each other as connected through a bus 370. However, each component included in the communication node 300 may be connected to the processor 310 via an individual interface or a separate bus, rather than the common bus 370. For example, the processor 310 may be connected to at least one of the memory 320, the transceiver 330, the input interface device 340, the output interface device 350, and the storage device 360 via a dedicated interface.

The processor 310 may execute a program stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

FIG. 4 is a structural diagram illustrating a first exemplary embodiment of a slot format in a communication system.

Referring to FIG. 4, a slot format in the communication system may designate a position (hereinafter referred to as 'DL/UL switching position') for switching downlink (DL) transmission and uplink (UL) transmission within one slot in units of symbols, unlike the LTE. In such the situation, if the communication system uses a dynamic TDD scheme for changing the DL/UL switching position for each base station, inter-base station interference and inter-terminal interference may occur severely, thereby reducing the performance of the communication system.

Figure 5:
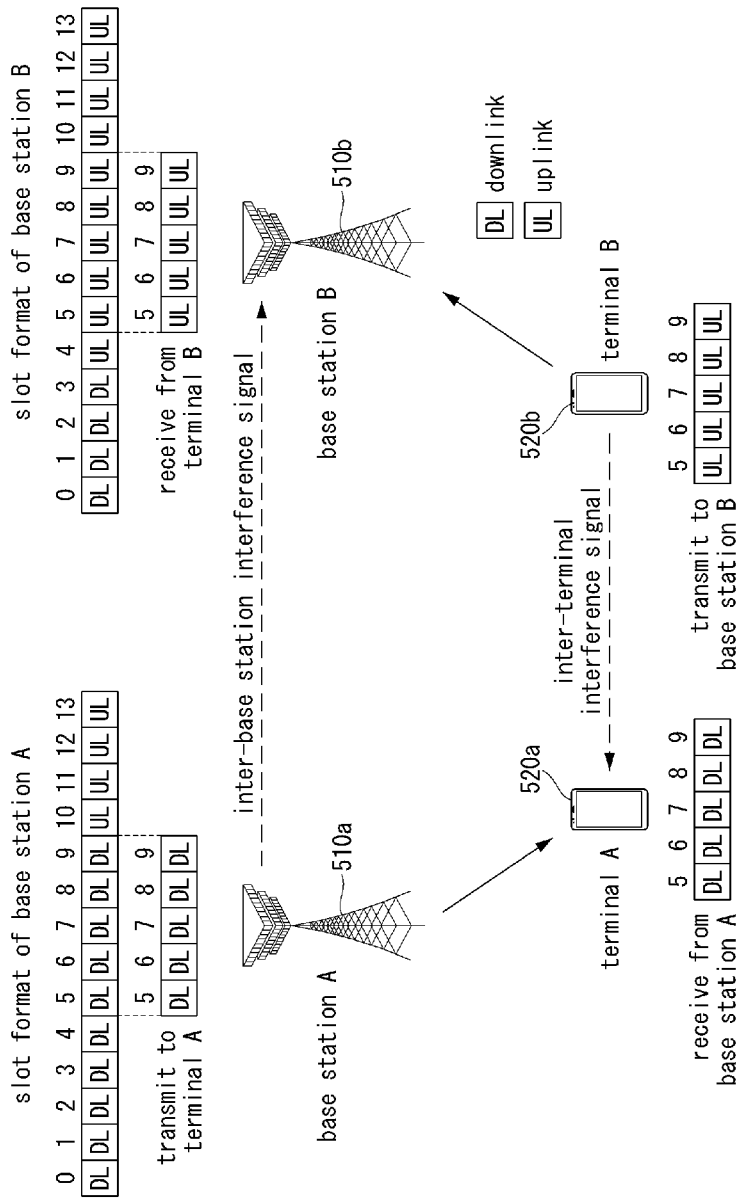
FIG. 5 is a conceptual diagram illustrating a first exemplary embodiment of a communication system to which a dynamic TDD scheme is applied.

FIG. 5 is a conceptual diagram illustrating a first exemplary embodiment of a communication system to which a dynamic TDD scheme is applied.

Referring to FIG. 5, a communication system to which the dynamic TDD scheme is applied may change a DL/UL switching position for each base station 510a or 510b. That is, the base station A 510a may transmit a downlink signal to a terminal A 520a in symbols #5 to #9. Then, the terminal A may receive the downlink signals in the symbols #5 to #9 from the base station A.

On the other hand, a terminal B 520b may transmit an uplink signal in the symbols #5 to #9 to the base station B 510b. Accordingly, the base station B may receive the uplink signal from the terminal B in the symbols #5 to #9. In this case, the downlink signal transmitted from the base station A to the terminal A may act as an interference signal to the base station B. Also, the uplink signal transmitted from the terminal B to the base station B may act as an interference signal to the terminal A.

As described above, if the communication system uses the dynamic TDD scheme that changes the DL/UL switching position for each base station, interference may occur among the communication nodes (e.g., base station A, base station B, terminal A, and terminal B), thereby degrading the performance of the communication system. In particular, in the environment in which a plurality of TRPs are densely arranged, the degree of interference may become more severe, resulting in increased capacity degradation.

Due to the above-described problem, a communication system may generally use a static TDD scheme having the same DL/UL switching position between base stations that may affect each other. As such, in order for the communication system to use the static TDD scheme, methods such as uplink power control and cell clustering may be considered.

However, when the density of the base stations increases even in the communication system using the static TDD scheme, the DL/UL switching positions thereof may still be changed in units of symbols, so that the performance improvement in mobile communication may be limited. In addition, when the communication system uses the static TDD scheme, a transmission ratio of DL and UL may be fixed for each TRP.

In addition, when the communication system uses the static TDD scheme, a resource waste may increase in terminals requiring various types of services having different DL and UL transmission ratios. In addition, when the communication system uses the static TDD scheme, there may be restrictions in supporting terminals sensitive to latency. In particular, when the communication system uses the static TDD scheme in the UDN environment in which TRPs and terminals are densely arranged, inefficiency of transmission resources may gradually increase, and thus, use of the dynamic TDD scheme may be required.

Meanwhile, a communication system using the TDD scheme may increase capacity by transmitting (e.g., beamforming) downlink data using channel information between a base station and a terminal. As such, in the communication system using the TDD scheme, as the number of antennas of the base station and the terminal increases, the overhead in using radio resources according to channel information exchange may gradually increase.

Accordingly, the communication system using the TDD scheme may consider a method of transmitting downlink data using uplink channel information in order to reduce overhead. In order for the communication system to use uplink radio channel information for downlink transmission by using the TDD scheme, a channel reciprocity between uplink and downlink may need to be guaranteed.

Figure 6:
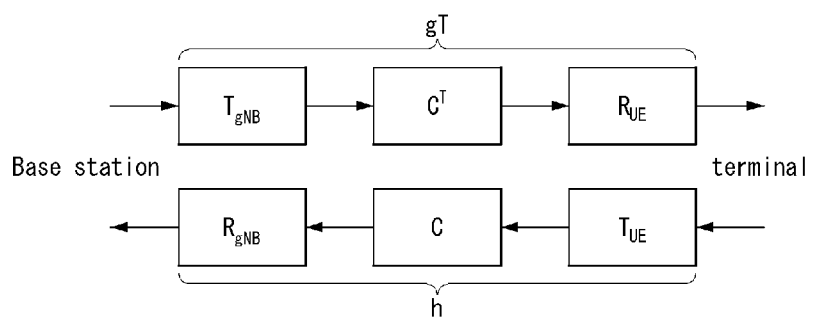
FIG. 6 is a conceptual diagram illustrating a first exemplary embodiment of a transmission/reception model between a base station and a terminal.

FIG. 6 is a conceptual diagram illustrating a first exemplary embodiment of a transmission/reception model between a base station and a terminal.

Referring to FIG. 6, in a transmission/reception model between a base station and a terminal, downlink channel information may be $g^T$, and uplink channel information may be h. In the communication system using the TDD scheme in which channel reciprocity is guaranteed, $g^T$=h may be established. In the transmission/reception model between the base station and the terminal, $T_{gNB}$ may be a function of a transmission radio frequency (RF) hardware of the base station, and $T_{UE}$ may be a function of a transmission RF hardware of the terminal. $C^T$ may be a downlink radio channel, and C may be an uplink radio channel.

Here, $g^T$ may be defined as $g^T = R_{UE} C^T T_{gNB}$. In addition, h may be defined as $h = R_{gNB} C T_{UE}$. In general, $C^T$=C may be established. Due to imperfection of the transmission/reception RF, $T_{gNB} \neq T_{UE}$ may be established, $R_{UE} \neq R_{gNB}$ may be established, and thus $g^T \neq h$.

Therefore, calibration may be required to obtain $g^T$=h. In this regard, a communication system (e.g., centralized multiple-input and multiple-output (MIMO) system), in which transmission/reception antennas are physically gathered at a base station, uses the same oscillator output, so that the channel reciprocity can be secured.

However, in a communication system in which a plurality of TRPs are physically separated, an output of a common oscillator cannot be used, and thus a timing error of each TRP may occur. Accordingly, in the communication system in which a plurality of TRPs are physically separated, performance degradation may occur due to additional overhead on radio channels for compensating for a frequency offset, increase in complexity for timing correction, and frequency estimation error.

In addition, in such the communication system, the plurality of TRPs may need to transmit channel information between the TRPs and terminals to a controller. In addition, in such the communication system, the controller may need to transmit determined beam weights to the TRPs. To this end, the communication system in which a plurality of TRPs are physically separated may require a large amount of wired or wireless resources between the TRPs and the controller.

Accordingly, the present disclosure is directed to increasing a transmission efficiency in a mobile communication system for providing high-capacity services and a transmission method using multiple TRPs. In addition, the present disclosure may provide a method by which a plurality of TRPs perform downlink transmissions and uplink receptions without increasing interference, thereby increasing the performance of the communication system. In addition, the present disclosure may allow each TRP to receive beams transmitted by adjacent TRPs by using predetermined beams so that no calibration is required. In addition, the present disclosure may provide a method and an apparatus by which each TRP may identify beams having large interferences among the beams transmitted by adjacent TRPs, and deliver information on the identified beams to the controller so that inter-TRP interference can be minimized in the dynamic TDD operation. Further, the present disclosure may provide a procedure and a method by which each TRP may select a link capable of minimizing inter-terminal interference by measuring a strength of a transmission beam transmitted by the terminal, and using the measured strength of the transmission beam.

Meanwhile, each of the plurality of physically separated TRPs in the C-RAN structure may transmit signals by using predefined transmission beams. Accordingly, each of the plurality of terminals may receive the signals, which are transmitted using the transmission beams from the plurality of TRPs, by using reception beams. Here, the reception beam may have the same beam pattern as the corresponding transmission beam. Also, the reception beam may mean a reception direction. In addition, an index of the transmission beam and an index of the reception beam may be the same. Each of the plurality of TRPs may transmit data by using the transmission beam having the same pattern as the reception beam selected by the terminal. A connection between the transmission beam of each TRP and the reception beam of each terminal may be referred to as a link.

Figure 7A:
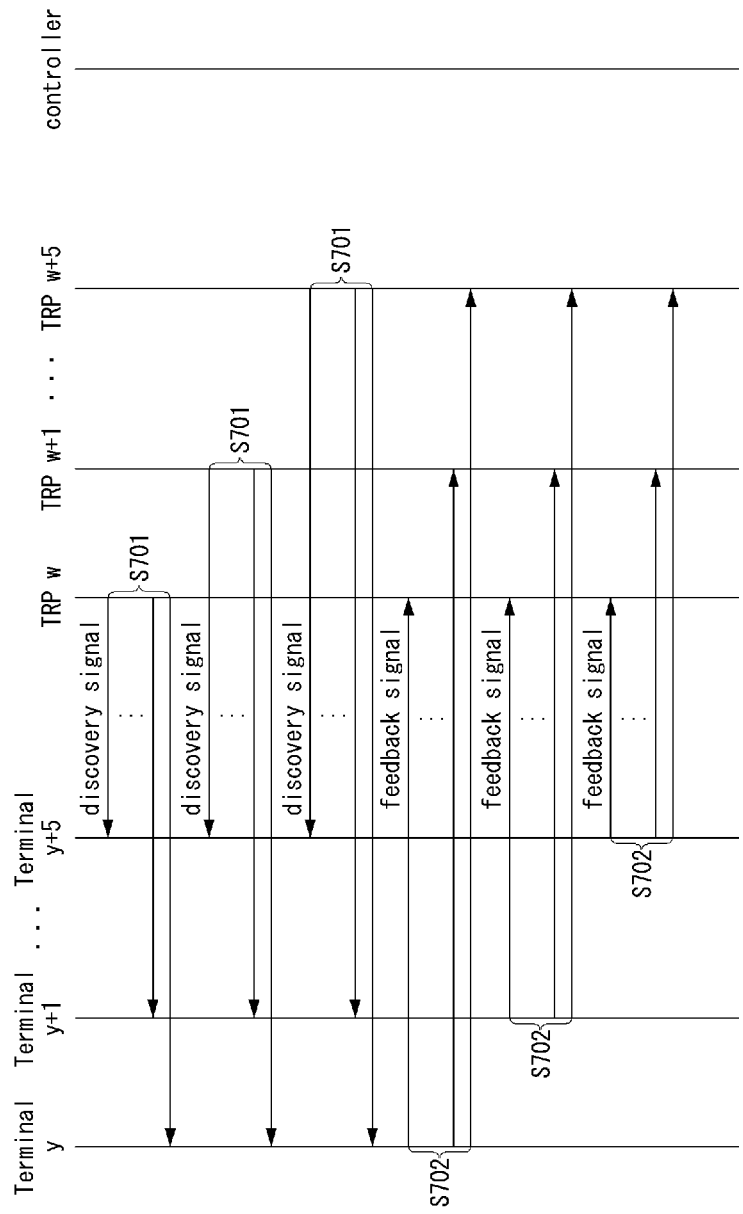
FIGS. 7A and 7B are sequence charts illustrating a first exemplary embodiment of a signal transmission/reception method for cooperative transmission in a communication system.
Figure 7B:
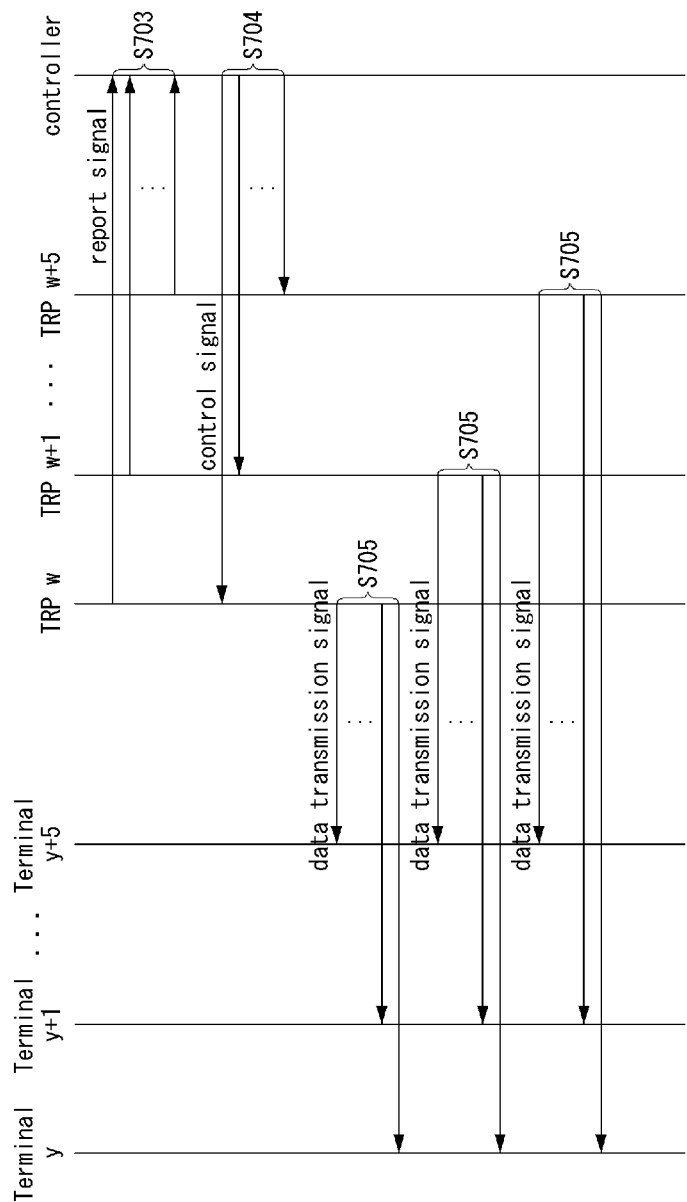

FIGS. 7A and 7B are sequence charts illustrating a first exemplary embodiment of a signal transmission/reception method for cooperative transmission in a communication system.

Referring to FIGS. 7A and 7B, in a signal transmission/reception method for cooperative transmission in a communication system, a plurality of physically separated TRPs may sequentially or simultaneously transmit discovery signals to terminals by using one or more predefined transmission beams (S701). Here, six TRPs may be assumed, and six terminals may be assumed. Each TRP may transmit a discovery signal including a TRP identifier (ID) and an index of a transmission beam. The TRP ID included in the discovery signal may be an identifier of the TRP transmitting the discovery signal, and the index of the transmission beam included in the discovery signal may be an identifier of the transmission beam being used for transmission of the discovery signal.

Accordingly, the terminals may identify the transmission beam by obtaining the TRP ID and the index of the transmission beam from each discovery signal. Alternatively, each of the TRPs may transmit a control channel (e.g., physical downlink control channel (PDCCH)) including the index of the transmission beam of the TRP and the TRP ID of the TRP by using the transmission beam. Then, the terminal may receive the control channel including the TRP ID and the index of the transmission beam of the TRP, and may identify the transmission beam by obtaining the TRP ID and the index of the transmission beam from the received control channel. Alternatively, the TRP may transmit, to the terminal, a sequence capable of identifying the TRP ID associated with the transmission beam and the index of the transmission beam associated with the TRP by using time and frequency domain resources. Accordingly, the terminal may receive the sequence capable of identifying the TRP ID and the index of the transmission beam of the TRP by monitoring the corresponding time and frequency domain resources, and identify the transmission beam by obtaining the TRP ID and the index of the transmission beam based on the received sequence.

On the other hand, the terminal may receive the discovery signals from the TRPs by using one or more reception beams. Then, the terminal may measure signal strengths of the received discovery signals. In addition, the terminal may obtain TRP IDs and indexes of transmission beams used to transmit the received discovery signals.

Thereafter, each terminal may generate feedback information including information on beam pairs of the receptions beams of the terminal and the transmission beams associated therewith (i.e., beam pair information) and information on signal strengths of the transmission beams, by using the measured signal strengths of the discovery signals. Here, the information on the signal strengths of the transmission beams may be information on signal strengths of the discovery signals transmitted using the transmission beams.

In addition, each terminal may transmit feedback signals including the feedback information to the TRPs (S702). Such the feedback information may include the beam pair information and the information on the signal strengths of the transmission beams. Here, the beam pair information of the feedback information may be configured as (transmission beam identification information, reception beam identification information). Here, the identification information of the transmission beam may include a TRP ID of the TRP having transmitted the transmission beam and an index of the transmission beam of the TRP. Also, the information on the signal strength of the transmission beam may include an SINR of the transmission beam. Here, the SINR of the transmission beam may be an SINR of the discovery signal transmitted using the transmission beam. Further, the identification information on the reception beam may be an index of the reception beam.

Here, the SINR, as an example of a signal strength, may be substituted with one or a combination of various measurement values such as received signal strength indicator (RSSI), reference signal received power (RSRP), and reference signal received quality (RSRQ). The terminal may reduce the overhead by including only SINRs equal or greater than a threshold among the measured SINRs in the feedback information and transmitting the feedback information the TRPs. The terminal may additionally include a terminal ID in the feedback information. When a TRP or controller allocates uplink resources for the terminal, the TRP already knows the terminal, so there may be no need to feed back the terminal ID.

Table 1 below may show an example of the feedback information that the terminal transmits to the TRPs. Table 1 shows feedback information for a case where one terminal having eight reception beams exists and six TRPs respectively having TRP IDs w, w+1, w+2, w+3, w+4, and TRP w+5 exist around the terminal. The TRP w may have 16 transmission beams, the TRP w+1 may also have 16 transmission beams, the TRP w+2 may have 8 transmission beams, the TRP w+3 may have 16 transmission beams, the TRP w+4 may have 4 transmission beams, and the TRP w+5 may have 8 transmission beams. The indexes of the reception beams of the terminal, the TRP IDs of the TRPs, and the indexes of the transmission beams of the TRP transmitted by the TRPs, which are used in the present disclosure, are arbitrarily determined for convenience of explanation, and other non-continuous IDs or indexes may be used. The SINR may be in dB units.

In Table 1, the terminal may reduce overhead by including SINRs equal to or greater than 2 dB among the measured SINRs in the feedback information, and transmitting the feedback information to the TRPs. In Table 1, bold underlined SINR values equal to or greater than 2 dB may be included in the feedback information.

Referring to Table 1, the feedback information may include the beam pair information and information on the signal strengths of the transmission beams corresponding to the beam pair information, and the beam pair information may be configured as (transmission beam identification information, reception beam identification information). Here, the identification information of the transmission beam may include a TRP ID of the TRP having transmitted the transmission beam and an index of the transmission beam of the TRP. In addition, the information on the signal strength of the transmission beam may be an SINR of the transmission beam. Further, the identification information of the reception beam may be an index of the reception beam.

For example, the feedback information may include beam pair information of ((w+3, 10), 1). Here, w+3 may be a TRP ID of the TRP, 10 may be an index of the transmission beam of the TRP w+3, and 1 may be an index of the reception beam of the terminal. When the beam pair information is ((w+3, 10), 1), the SINR of the transmission beam, which is a signal strength of the transmission beam, may be 8.2 dB.

TABLE 1

| UE RX beam index | TRP w TX beam index | SINR | TRP w+1 TX beam index | SINR | TRP w+2 TX beam index | SINR | TRP w+3 TX beam index | SINR | TRP w+4 TX beam index | SINR | TRP w+5 TX beam index | SINR |
|---|---|---|---|---|---|---|---|---|---|---|---|---|
| 0 | — | — | — | — | — | — | — | — | — | — | — | — |
| 1 | — | — | — | — | — | — | __10__ | __8.2__ | 1 | 0.2 | — | — |
|   | — | — | — | — | — | — | __11__ | __20.6__ | — | — | — | — |
|   | — | — | — | — | — | — | __12__ | __18.1__ | — | — | — | — |
| 2 | — | — | — | — | — | — | — | — | __1__ | __16.8__ | — | — |
| 3 | — | — | — | — | — | — | — | — | — | — | __1__ | __4.8__ |
|   | — | — | — | — | — | — | — | — | — | — | __2__ | __24.7__ |
|   | — | — | — | — | — | — | — | — | — | — | __3__ | __3.6__ |
|   | — | — | — | — | — | — | — | — | — | — | __2__ | __4.2__ |
|   | — | — | — | — | — | — | — | — | — | — | __3__ | __1.8__ |
| 4 | __6__ | __6.3__ | — | — | — | — | — | — | — | — | — | — |
|   | __7__ | __7.9__ | — | — | — | — | — | — | — | — | — | — |
|   | __8__ | __4.2__ | — | — | — | — | — | — | — | — | — | — |
| 5 | __8__ | __1.2__ | 6 | 1.3 | — | — | — | — | — | — | — | — |
| 6 | — | — | 7 | 2.8 | 2 | 3.8 | — | — | — | — | — | — |
|   | — | — | 8 | 6.4 | — | — | — | — | — | — | — | — |
|   | — | — | 9 | 1.3 | — | — | — | — | — | — | — | — |
| 7 | — | — | — | — | __2__ | __4.9__ | — | — | — | — | — | — |
|   | — | — | — | — | __3__ | __17.3__ | — | — | — | — | — | — |
|   | — | — | — | — | __4__ | __3.6__ | — | — | — | — | — | — |

On the other hand, the TRPs may receive the feedback signals including the feedback information from the terminals. Then, the TRPs may obtain the feedback information included in the received feedback signals. Thereafter, the TRPs may generate reception link information including the bam pair information on the transmission beams and the reception beams by which the transmission beams are received and the information on the signal strengths of the transmission beams by using the obtained feedback information.

Here, the reception link information may include the beam pair information for the transmission beams of the respective TRPs and the reception beams by which the transmission beams are received, and the information on the signal strengths of the transmission beams. The beam pair information of the reception link information may be configured as (transmission beam identification information, reception beam identification information). Here, the identification information of the transmission beam may include a TRP ID of the TRP having transmitted the transmission beam and an index of the transmission beam of the TRP. In addition, the identification information of the reception beam may be a terminal ID of the terminal using the reception beam and an index of the reception beam of the terminal. In addition, the information on the signal strength of the transmission beam may be an SINR of the transmission beam.

Table 2 may be an example of the reception link information. For example, the reception link information may include beam pair information of ((w, 0), (y+2, 2)). Here, w may be a TRP ID of the TRP, 0 may be an index of the transmission beam of the TRP, y+2 may be a terminal ID of the terminal, 2 may be an index of the reception beam of the terminal. When the beam pair information of the reception link information is ((w, 0), (y+2, 2)), the SINR, which is a signal strength of the transmission beam, may be 21.5 dB. Any transmission beam of the TRP may include identification information of a plurality of reception beams fed back from one terminal. In addition, any transmission beam of the TRP may include identification information of a plurality of reception beams fed back from other terminals. In Table 2, bold underlined values may be values fed back from a terminal y.

TABLE 2

| TRP ID | TRP TX beam index | UE ID | UE RX beam index | SINR (unit:dB) |
|---|---|---|---|---|
| w | 0 | y + 2 | 2 | 21.5 |
|   |   | y + 4 | 4 | 32.2 |
|   |   |   | 5 | 11.3 |
|   | 1 | y + 2 | 3 | 1.8 |
|   |   | y + 5 | 2 | 8.4 |
|   | 2 | y + 2 | 7 | 6.7 |
|   | 3 | y + 3 | 1 | 18.8 |
|   |   |   | 2 | 22.4 |
|   |   | y + 2 | 1 | 2.8 |
|   | 4 | — | — | — |
|   | 5 | y + 1 | 0 | 4.9 |
|   | 6 | __y__ | __4__ | __6.3__ |
|   |   | y + 3 | 2 | 17.2 |
|   | 7 | __y__ | __4__ | __7.9__ |
|   |   | y + 1 | 3 | 18.8 |
|   | 8 | __y__ | __4__ | __4.2__ |
|   |   |   | __5__ | __1.2__ |
|   |   | y + 4 | 3 | 21.1 |
|   | ... | ... | ... | ... |
|   | 15 | y + 3 | 2 | 21.1 |
| ... | ... | ... | ... | ... |
| w + 2 | 3 | __y__ | __7__ | __17.3__ |
|   |   | y + 2 | 3 | 3.8 |
|   | ... | ... | ... | ... |
| w + 3 | ... | ... | ... | ... |
|   | 11 | __y__ | __1__ | __20.6__ |
|   | 12 | __y__ | __1__ | __18.1__ |
|   | ... | ... | ... | ... |
| w + 4 | ... | ... | ... | ... |
|   | 1 | __y__ | __2__ | __16.8__ |
|   |   | y + 4 | 3 | 4.2 |
|   |   |   | 2 | 1.8 |
|   | ... | ... | ... | ... |
| w + 5 | ... | ... | ... | ... |
|   | 2 | __y__ | __3__ | __24.7__ |
|   |   |   | 4 | 4.2 |
|   |   |   | 3 | 4.1 |
|   | ... | ... | ... | ... |

On the other hand, the TRPs may transmit report signals including the generated reception link information to the controller (S703). Then, the controller may receive the report signals including the reception link information from the TRPs. In addition, the controller may obtain the reception link information from the received report signals. Thereafter, the controller may generate transmission link information that can be used when the TRPs transmit data to the terminals, by using the obtained reception link information. Here, the transmission link information may include transmission beam pair information on transmission beams to be used by each TRP for transmitting data to the respective terminals of the TRP and reception beams for receiving signals transmitted using the transmission beams. The transmission beam pair information of the transmission link information may be configured as (transmission beam identification information, reception beam identification information). Here, the identification information of the transmission beam may include a TRP ID of the TRP having transmitted the transmission beam and an index of the transmission beam of the TRP. In addition, the identification information of the reception beam may include a terminal ID of the terminal that is to use the reception beam, and an index of the reception beam of the terminal.

Table 3 may be an example of the transmission link information. For example, the transmission link information may include transmission beam pair information of ((w, 0), (y+2, 2)). Here, w may be a TRP ID of the corresponding TRP, 0 may be an index of the transmission beam of the TRP, y+2 may be an ID of the terminal, 2 may be an index of the reception beam of the terminal.

Referring to Table 3, each TRP may not need to transmit data by using all transmission beams. In addition, each TRP may form links for reception beams of a plurality of terminals with the plurality of terminals. In Table 3, bold underlined values may be TRP IDs and indexes of the transmission beams of the TRPs selected for the terminal y.

TABLE 3

| TRP ID | TRP TX beam index | UE ID | UE RX beam index |
|---|---|---|---|
| w | 0 | y + 2 | 2 |
|   |   | y + 4 | 4 |
|   | 1 | y + 5 | 2 |
|   | 2 | — | — |
|   | 3 | y + 3 | 1 |
|   |   |   | 2 |
|   | ... | ... | ... |
|   | 6 | y + 3 | 2 |
|   | 7 | y + 1 | 3 |
|   | 8 | y + 4 | 5 |
|   | ... | ... | ... |
|   | 15 | y + 3 | 2 |
| ... | ... | ... | ... |
| w + 2 | ... | ... | ... |
|   | <u>3</u> | <u>y</u> | <u>7</u> |
|   | ... | ... | ... |
| w + 3 | ... | ... | ... |
|   | <u>11</u> | <u>y</u> | <u>1</u> |
|   | <u>12</u> |   | <u>1</u> |
|   | ... | ... | ... |
| w + 4 | ... | ... | ... |
|   | <u>1</u> | <u>y</u> | <u>2</u> |
|   | ... | ... | ... |
| w + 5 | ... | ... | ... |
|   | <u>2</u> | <u>y</u> | <u>3</u> |
|   | ... | ... | ... |

On the other hand, the controller may generate control signals including the transmission link information and transmit the generated control signals to the TRPs (S704). Then, the TRPs may receive the control signals including the transmission link information from the controller. Then, the TRPs may obtain the transmission link information from the received control signals.

Table 4 may show a detailed example of the transmission link information when a TRP ID of the TRP is w+2. For example, when the TRP ID is w+2, the transmission link information may include transmission beam pair information of (0, (y+3, 2)). Here, 0 may be an index of the transmission beam of the TRP w+2, y+3 may be an ID of the terminal, and 2 may be an index of the reception beam of the terminal. Referring to Table 4, the TRP w+2 may transmit data to the terminals y to y+5 by using the transmission beams #1 to #7.

Accordingly, when transmitting data to the terminals, the TRPs may transmit data using transmission links according to the transmission link information obtained. That is, when transmitting the data to the terminals, the TRPs may generate data transmission signals including data to be transmitted. Then, the TRPs may transmit the generated data transmission signals to the terminals by using the transmission beams according to the transmission link information (S705). In this case, when the number of transmission beams according to the transmission link information is two or more, the TRPs may transmit the transmission beams simultaneously or sequentially to reduce an error probability through a spatial diversity gain. In Table 4, bold underlined values may be the indexes of the transmission beams selected for the terminal y.

On the other hand, the terminal may receive the data transmission signals including the data from TRPs. Then, the terminal may obtain the data from the data transmission signals. In this case, the terminal may not use all reception beams, and may consider the SINR value fed back through uplink in order to reduce power consumption and hardware complexity. Accordingly, the terminal may receive the data transmission signals, and obtain the data by using only reception beams corresponding to the transmission beams that are expected to be transmitted by the TRPs.

TABLE 4

| TRP TX beam index | UE ID | UE RX beam index |
|---|---|---|
| 0 | y + 3 | 2 |
| 1 | y + 2 | 3 |
|   | y + 5 | 0 |
| 2 | y + 1 | 4 |
| <u>3</u> | <u>y</u> | <u>7</u> |
| <u>4</u> | <u>y + 1</u> | <u>6</u> |
|   |   | 3 |
|   | y + 4 | 1 |
| 5 | y + 2 | 4 |
| 6 | y + 3 | 5 |
|   | y + 4 | 2 |
| 7 | y + 5 | 4 |

Figure 8:
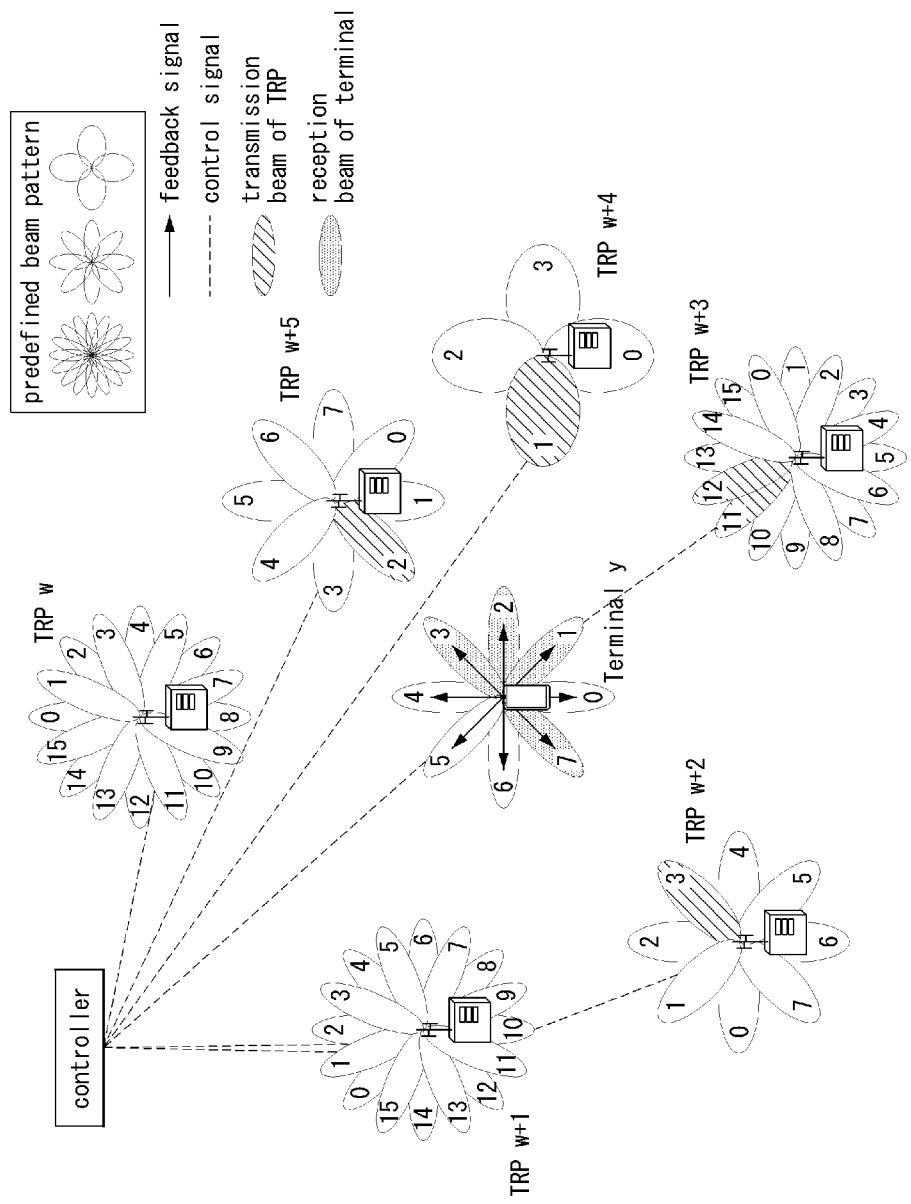
FIG. 8 is a conceptual diagram illustrating a first exemplary embodiment of a signal transmission/reception method for cooperative transmission in a communication system.

FIG. 8 is a conceptual diagram illustrating a first exemplary embodiment of a signal transmission/reception method for cooperative transmission in a communication system.

Referring to FIG. 8, in a signal transmission/reception method for cooperative transmission in a communication system, TRPs participating in cooperative transmission for the terminal y among TRPs in the communication system may be TRPs w+2 to w+5. In addition, among the TRPs participating in the cooperative transmission, the TRP w+2 may transmit data to the terminal y by using a transmission beam #3. Then, the terminal y may receive the data from the RP w+2 by using a reception beam #7.

Then, among the TRPs participating in the cooperative transmission, the TRP w+3 may transmit data to the terminal y by using transmission beams #11 and #12. Then, the terminal y may receive the data, which is transmitted from the TRP w+3 using the transmission beams #11 and #12, by using a reception beam #1. Then, the TRP w+4 among the TRPs participating in the cooperative transmission may transmit data to the terminal y by using a transmission beam #1. Then, the terminal y may receive the data, which is transmitted from the TRP w+4 using the transmit beam #1, by using a reception beam #2.

Finally, the TRP w+5 among the TRPs participating in the cooperative transmission may transmit data to the terminal y by using a transmission beam #2. Then, the terminal y may receive the data, which is transmitted from the TRP w+5 using the transmission beam #2, by using a reception beam #3. The above-described first exemplary embodiment is, for convenience of description, based on the communication system comprising one terminal, several TRPs adjacent to the terminal, and a controller. However, the method of the first exemplary embodiment may be easily extended to a UDN environment including more TRPs and terminals.

Figure 9:
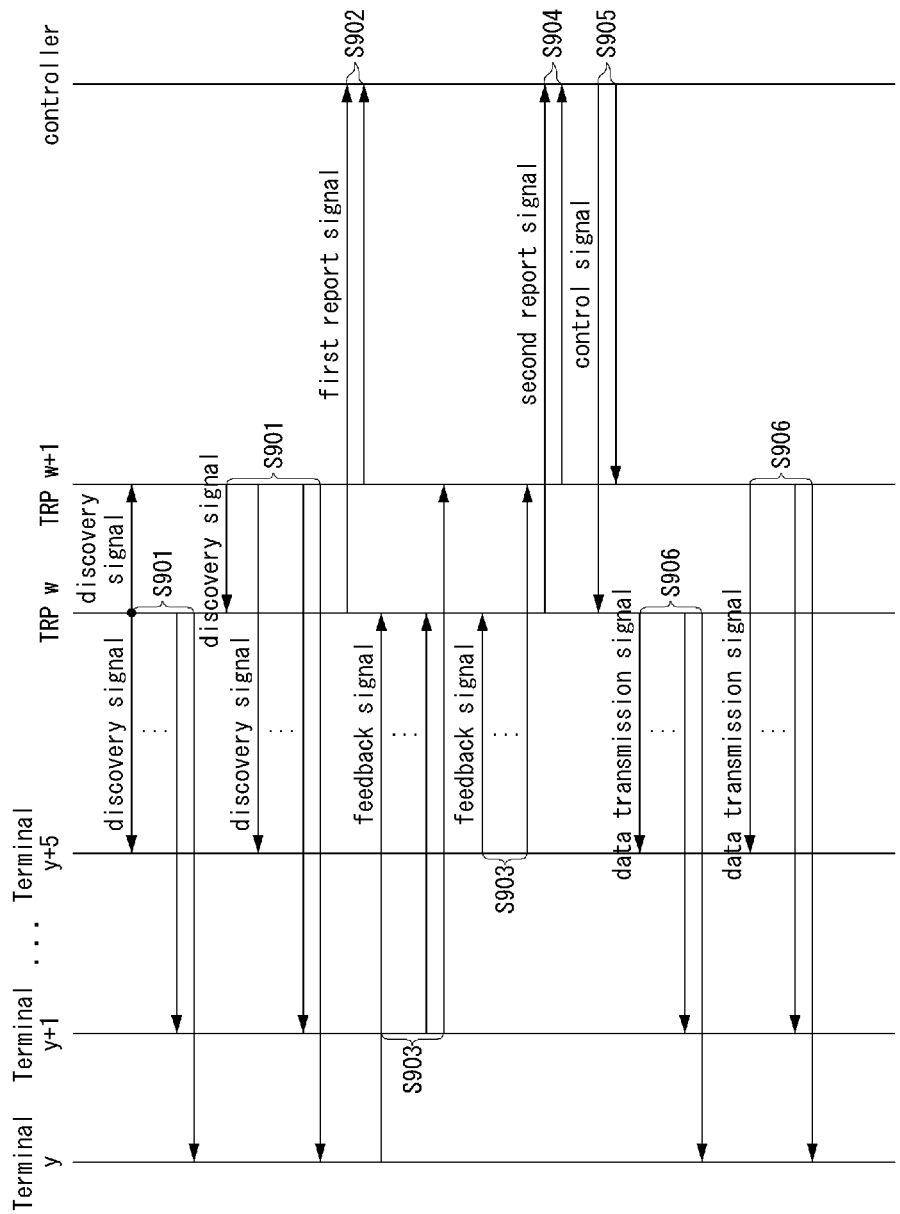
FIG. 9 is a sequence chart illustrating a second exemplary embodiment of a signal transmission/reception method for cooperative transmission in a communication system.

FIG. 9 is a sequence chart illustrating a second exemplary embodiment of a signal transmission/reception method for cooperative transmission in a communication system.

Referring to FIG. 9, in a signal transmission/reception method for cooperative transmission in a communication system, a plurality of physically separated TRPs may sequentially or simultaneously transmit discovery signals to terminals by using one or more predefined transmission beams (S901). Here, two TRPs may be assumed, and six terminals may be assumed. Each TRP may transmit a discovery signal including a TRP ID and an index of a transmission beam. The TRP ID included in the discovery signal may be an identifier of the TRP transmitting the discovery signal, and the index of the transmission beam included in the discovery signal may be an identifier of the transmission beam being used for transmission of the discovery signal. Accordingly, the terminals and adjacent TRPs may identify the TRP and the transmission beam by obtaining the TRP ID and the index of the transmission beam of the TRP from each discovery signal.

Alternatively, each of the TRPs may transmit a control channel (e.g., PDCCH) including the index of the transmission beam of the TRP and the TRP ID of the TRP by using the transmission beam. Then, the terminals and the adjacent TRPs may receive the control channel including the TRP ID and the index of the transmission beam of the TRP, and may identify the transmission beam by obtaining the TRP ID and the index of the transmission beam from the received control channel. Alternatively, each TRP may transmit a sequence capable of identifying the TRP ID associated with the transmission beam and the index of the transmission beam associated with the TRP to the terminals and adjacent TRPs by using time and frequency domain resources. Accordingly, the terminals and adjacent TRPs may receive the sequence capable of identifying the TRP ID and the index of the transmission beam by monitoring the corresponding time and frequency domain resources, and identify the transmission beam by obtaining the TRP ID and the index of the transmission beam of the TRP based on the received sequence.

On the other hand, the terminals and adjacent TRPs may receive the discovery signals from the TRPs by using one or more reception beams. Then, the terminals and the adjacent TRPs may measure signal strengths of the received discovery signals. In addition, the terminals and the adjacent TRPs may obtain the TRP ID and the index of the transmission beam of the TRP for the transmission beam used for transmitting each of the received discovery signals. Thereafter, the adjacent TRP may generate first reception link information including beam pair information of the reception beams of the adjacent TRP and the transmission beams associated therewith, and information on signal strengths of the transmission beams, by using the measured signal strengths of the discovery signals.

Here, the information on the signal strengths of the transmission beams may be information on signal strengths of the discovery signals transmitted using the transmission beams. In addition, the adjacent TRP may transmit a first report signal including the first reception link information to the controller (S902). Then, the controller may receive the first report signals including the first reception link information. Then, the controller may obtain the first reception link information from the first report signals.

The first reception link information transmitted by the adjacent TRP to the controller may include the beam pair information for the receptions beams of the corresponding adjacent TRP and the transmission beams received by using the reception beams and the information on the signal strengths of the transmission beams of the adjacent TRP. The beam pair information of the first reception link information may be configured as (transmission beam identification information, reception beam identification information). Here, the identification information of the transmission beam may include a TRP ID of the TRP having transmitted the transmission beam and an index of the transmission beam of the TRP. In addition, the identification information of the reception beam may include an TRP ID and an index of the reception beam of the reception TRP, that is the adjacent TRP using the reception beam. Also, the information on the signal strength of the transmission beam may include an SINR of the transmission beam.

Table 5 may show an example of the first reception link information. For example, the first reception link information may include beam pair information of ((0,2), (1, 4)). Here, 0 may be an index of the transmission beam of the corresponding transmission TRP, 2 may be an index of the transmission beam of the transmission TRP. Also, 1 may be an index of the reception beam of the reception TRP, and 4 may be an index of the reception beam of the reception TRP. When the beam pair information of the first reception link information is configured as ((0,2), (1, 4)), the SINR, which is a signal strength of the transmission beam, may be 1.8 dB. Any transmission beam of the transmission TRP may include identification information of a plurality of reception beams fed back from one reception TRP. In addition, any transmission beam of the transmission TRP may include identification information of a plurality of reception beams fed back from another adjacent TRP.

TABLE 5

| TX TRP ID | TX beam index (x) of TX TRP | RX TRP ID (w + 1) | RX beam index (x) of RX TRP | SINR (dB) |
|---|---|---|---|---|
| w | 0 | w + 1 | 4 | 4.3 |
|   |   |   | 5 | 2.1 |
|   | 1 | w + 1 | 3 | 8.8 |
|   |   |   | 4 | 21.4 |
|   |   |   | 5 | 6.2 |
|   | 2 | w + 1 | 3 | 5.1 |
|   |   |   | 4 | 1.8 |

On the other hand, the terminal may generate feedback information including the beam pair information for the reception beams of the terminal and the transmission beams associated therewith and the information on signal strengths of the transmission beams, by using the measured signal strengths of the discovery signals. Here, the signal strength of the transmission beam may be a signal strength of a discovery signal transmitted through the transmission beam. Then, the terminal may transmit feedback signals including the feedback information to the TRPs (S903). Such the feedback information may include the beam pair information and the information on the signal strengths of the transmission beams.

Here, the beam pair information of the feedback information may be configured as (transmission beam identification information, reception beam identification information). Here, the identification information of the transmission beam may include a TRP ID of the TRP having transmitted the transmission beam and an index of the transmission beam of the TRP. In addition, the information on the signal strength of the transmission beam may include an SINR of the transmission beam. Here, the SINR of the transmission beam may be an SINR of the discovery signal transmitted using the transmission beam. Also, the identification information of the reception beam may include an index of the reception beam. Table 1 above may show an example of the feedback information that the terminal transmits to the TRPs.

On the other hand, the TRPs may receive feedback signals including the feedback information from the terminals. Then, the TRPs may obtain the feedback information included in the received feedback signals. Thereafter, the TRPs may generate second reception link information including beam pair information for transmission beams and reception beams by which the transmission beams are received and information on signal strengths of the transmission beams.

Here, the second reception link information may include beam pair information for the transmission beams of each TRP and the reception beams by which the transmission beams are received, and information on signal strengths of the transmission beams. The beam pair information of the second reception link information may be configured as (transmission beam identification information, reception beam identification information). Here, the identification information of the transmission beam may include a TRP ID of the TRP having transmitted the transmission beam and an index of the transmission beam of the TRP. In addition, the identification information of the reception beam may include a terminal ID of the terminal using the reception beam and an index of the reception beam of the terminal. In addition, the information on the signal strength of the transmission beam may include an SINR of the transmission beam. Table 2 above may show an example of the second reception link information.

Meanwhile, the transmission TRP may transmit second report signals including the generated second reception link information to the controller (S904). Then, the controller may receive the second report signals including the second reception link information from the TRPs. In addition, the controller may obtain the second reception link information from the received second report signals. Thereafter, the controller may generate transmission link information that can be used when the TRPs transmit data to the terminals by using the first reception link information and the second reception link information obtained from the TRPs.

Figure 10:
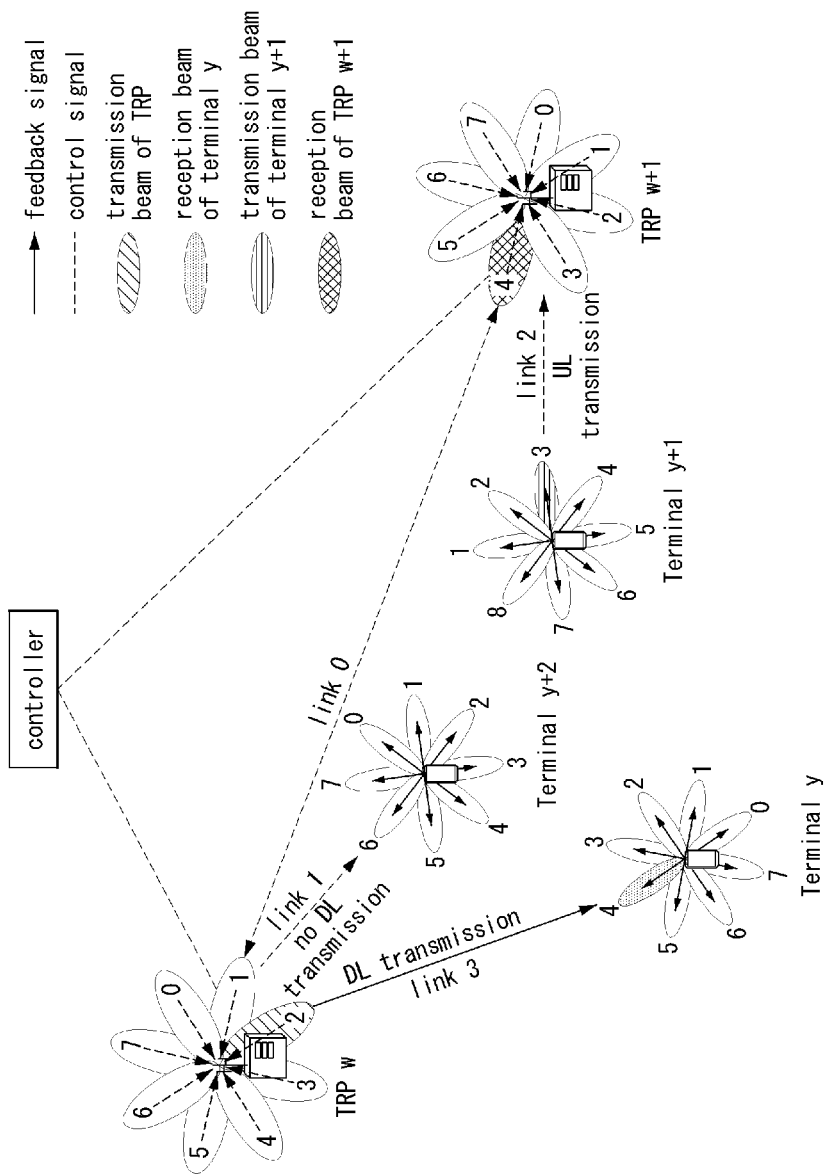
FIG. 10 is a conceptual diagram illustrating a second exemplary embodiment of a signal transmission/reception method for cooperative transmission in a communication system.

In this case, as shown in FIG. 10, the controller may determine slot formats of transmission links in consideration of the received signal strengths (i.e., SINRs) of the transmission beams between the TRPs. That is, the controller may determine transmission directions of symbols of the transmission links between the TRPs and the terminal in consideration of the received signal strengths (i.e., SINRs) of the transmission beams between the TRPs.

FIG. 10 is a conceptual diagram illustrating a second exemplary embodiment of a signal transmission/reception method for cooperative transmission in a communication system.

Referring to FIG. 10, in a signal transmission/reception method for cooperative transmission in a communication system, a link 0 may be established between a beam #1 of the TRP w and a beam #4 of the TRP w+1. In addition, a link 1 may be established between the beam #1 of the TRP w and a beam #6 of the terminal y+2. In addition, a link 2 may be established between a beam #4 of the TRP w+1 and a beam #4 of the terminal y+1. In addition, a link 3 may be established between a beam #2 of the TRP w and a beam #4 of the terminal y.

Referring to Table 5, when the TRP w constituting the link 0 transmits a signal using the beam #1 and the TRP w+1 constituting the link 0 receives a signal through the beam #4, the SINR may be 21.4 dB, so that a strength of an interference signal may be very large. Similarly, when the TRP w+1 constituting the link 0 transmits a signal using the beam #4, and the TRP w constituting the link 0 receives a signal through the beam #1, the SINR may be 21.4 dB, so that a strength of an interference signal may be very large. As described above, the intensity of the interference signal may be very large between the beam #1 of the TRP w and the beam #4 of the TRP w+1 constituting the link 0.

Accordingly, in order to avoid interference between the TRPs, the controller may configure the links 1 and 2 in which the TRP w has the beam #1 and the TRP w+1 has the beam #4 to have the same transmission direction in the same symbol. In addition, the controller may allow either one of the links 1 and 2 in which the TRP w has the beam #1 and the TRP w+1 has the beam #4 to transmit a signal in the corresponding symbol. In this manner, the controller may configure the links 1 and 2 in which the TRP w has the beam #1 and the TRP w+1 has the beam #4 not to have different transmission directions in the same symbol.

Table 6 may show possible link combinations and possible transmission directions on the links. For example, in Table 6, when the link 1 is for downlink and the link 2 may be for downlink, they have the same transmission direction and thus may be usable. In addition, when the link 1 is for downlink and the link 2 is not used, since a signal is transmitted on only one link in the corresponding symbol, they may be usable. On the other hand, when the link 1 is for downlink and the link 2 is for uplink, since a signal transmitted through the beam #1 of the TRP w, that is a transmission signal of the link 1, is received as an interference at the beam #4 of the TRP w+1, that is a reception beam of the link 2, in addition to a signal of the beam #3 of the terminal y+1 that needs to be received. In this manner, the controller may configure the transmission links using beams related to a beam pair having a large inter-TRP interference to have the same transmission direction in the same symbol, or configure only one of the transmission links to transmit signals in the corresponding symbol.

Here, the beam pair having a large inter-TRP interference may mean a beam pair having an SINR greater than or equal to a threshold. The controller may select a link combination in which interference according to DL and UL does not occur, for example, when a beam related to the link 0 is used for transmission and reception by TRPs and a terminal.

On the other hand, FIG. 10 corresponds to a case 6 of Table 6, where the TRP w may not transmit a downlink signal to the terminal y+2 through the beam #1 of the TRP, and the TRP w+1 may receive an uplink signal from the terminal y+1 through the beam #4 of the TRP. As such, in the case 6, since the TRP w does not transmit a downlink signal to the terminal y+2 through the beam #1 of the TRP, the interference that the link 0 exerts on the link 2 may be mitigated. On the other hand, as shown in Table 6, the link 3 having less interference from the link 0 may be used for both DL and UL.

TABLE 6

| | Possible link combinations: DL/UL/Not used | | | |
| --- | --- | --- | --- | --- |
| case | link 1 (TRP{w, 1}, UE{y + 2, 6}) | link 2 (TRP{w + 1, 4}, UE{y + 1, 3}) | link 3 (TRP{w, 2}, UE{y, 4}) | usable (○, X) |
| 0 | DL | DL | DL/UL/X | ○ |
| 1 | DL | UL | DL/UL/X | X |
| 2 | DL | Not used | DL/UL/X | ○ |
| 3 | UL | UL | DL/UL/X | ○ |
| 4 | UL | DL | DL/UL/X | X |
| 5 | UL | Not used | DL/UL/X | ○ |
| 6 | Not used | UL | DL/UL/X | ○ |
| 7 | Not used | DL | DL/UL/X | ○ |

Referring again to FIG. 9, the controller may generate control signals including the transmission link information in which transmission directions of symbols are designated, and transmit the generated control signals to the TRPs (S905). Then, the TRPs may receive, from the controller, the control signals including the transmission link information in which the transmission directions of the symbols are designated. In addition, the TRPs may obtain the transmission link information in which the transmission directions of symbols are designated from the received control signals. Accordingly, the TRPs may transmit data in accordance with the transmission directions of the symbols by using transmission links according to the transmission link information in which the transmission direction of the symbols are designated, so that the transmission directions of the symbols are matched.

That is, when transmitting the data to the terminals, the TRPs may generate data transmission signals including data to be transmitted. In addition, the TRPs may transmit the generated data transmission signals to the terminals through symbols having downlink transmission directions according to the transmission link information by using the transmission beams (S906). Here, when the number of transmission beams according to the transmission link information is two or more, the TRPs may transmit the transmission beams simultaneously or sequentially to reduce an error probability through a spatial diversity gain. The terminal may receive the data transmission signals including the data from the TRPs. Then, the terminal may obtain the data from the data transmission signals. In this case, the terminal may not use all reception beams, and may consider SINR values fed back through uplink in order to reduce power consumption and hardware complexity.

Accordingly, the terminal may receive the data transmission signals by using only reception beams corresponding to transmission beams expected to be transmitted by the TRPs, and obtain the data. On the other hand, the terminal may transmit the data signals to the TRPs. In addition, the TRP may receive the data signals from the terminal by using reception beams through symbols having an uplink transmission direction in the transmission link information. Then, the TRP may obtain the data from the received data signals.

On the other hand, the terminal may transmit signals to the TRPs. Then, the TRP may measure signal strengths of the signals received from the terminal by using the same reception beams of the TRP in order to mitigate inter-terminal interference in the dynamic TDD scheme. In addition, the TRP may determine whether to use the link based on the measured signal strengths of the received signals, and determine whether to use the link for DL or UL based on the measured signal strengths of the received signals.

Figure 11:
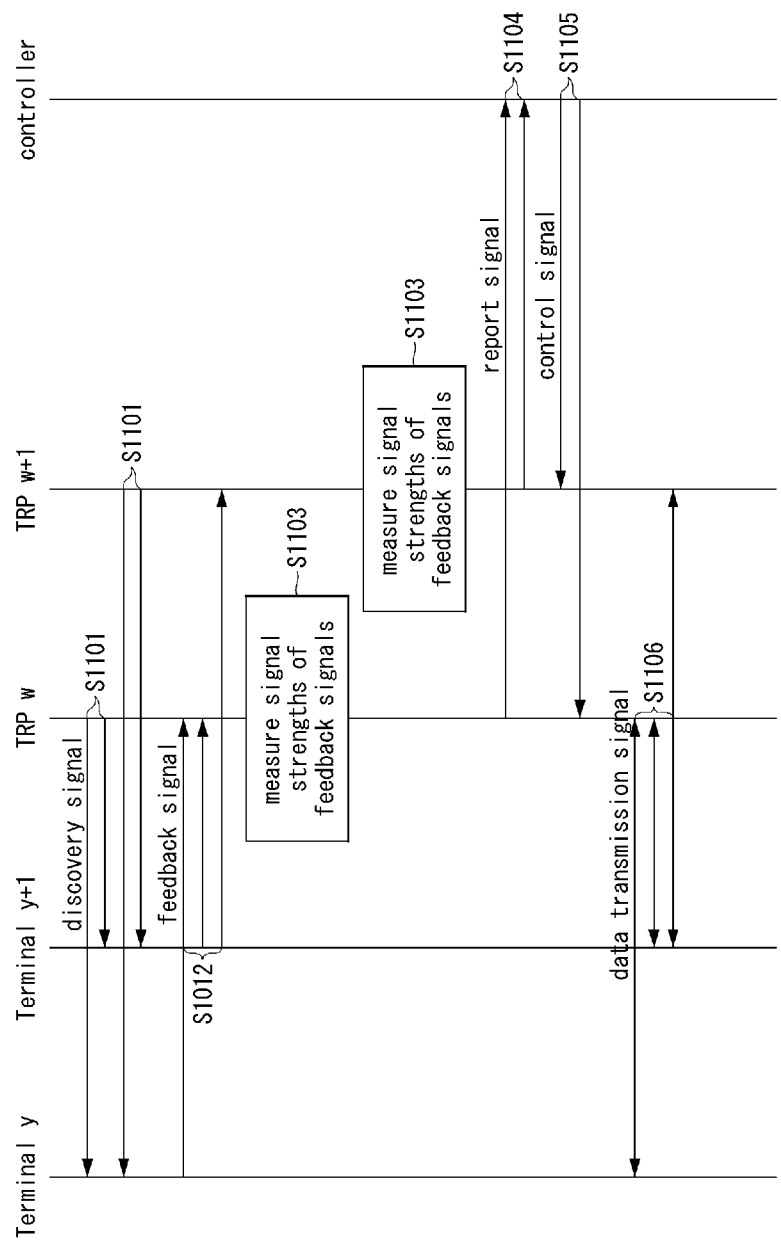
FIG. 11 is a sequence chart illustrating a third exemplary embodiment of a signal transmission/reception method for cooperative transmission in a communication system.

FIG. 11 is a sequence chart illustrating a third exemplary embodiment of a signal transmission/reception method for cooperative transmission in a communication system.

Referring to FIG. 11, in a signal transmission/reception method for cooperative transmission in a communication system, a plurality of physically separated TRPs may sequentially or simultaneously transmit discovery signals to terminals by using one or more predefined transmission beams (S1101). Here, two TRPs may be assumed, and two terminals may be assumed. Each TRP may transmit a discovery signal including a TRP identifier (ID) and an index of a transmission beam. The TRP ID included in the discovery signal may be an identifier of the TRP transmitting the discovery signal, and the index of the transmission beam included in the discovery signal may be an identifier of the transmission beam being used for transmission of the discovery signal. Accordingly, the terminals may identify the TRP and the transmission beam by obtaining the TRP ID and the index of the transmission beam of the TRP in each discovery signal.

Alternatively, each of the TRPs may transmit a control channel (e.g., PDCCH) including the index of the transmission beam of the TRP and the TRP ID of the TRP by using the transmission beam. Then, the terminal may receive the control channel including the TRP ID and the index of the transmission beam of the TRP, and may identify the transmission beam by obtaining the TRP ID and the index of the transmission beam of the TRP from the received control channel. Alternatively, the TRP may transmit a sequence capable of identifying the TRP ID associated with the transmission beam and the index of the transmission beam associated with the TRP to the terminal by using time and frequency domain resources. Accordingly, the terminal may receive the sequence capable of identifying the TRP ID and the index of the transmission beam of the TRP by monitoring the corresponding time and frequency domain resources, and identify the transmission beam by obtaining the TRP ID and the index of the transmission beam of the TRP based on the received sequence.

On the other hand, the terminal may receive the discovery signals from the TRPs by using one or more reception beams. Then, the terminal may measure signal strengths of the received discovery signals. In addition, the terminal may obtain the TRP ID and the index of the transmission beam of the TRP for each transmission beam used for transmitting each of the received discovery signals. Thereafter, the terminal may generate feedback information including beam pair information for the reception beams of the terminal and the transmission beams associated therewith and information on signal strengths of the transmission beams, by using the measured signal strengths of the discovery signals.

Here, the information on the signal strengths of the transmission beams may be information on signal strengths of the discovery signals transmitted using the transmission beams. In addition, the terminal may transmit feedback signals including the feedback information to the TRPs (S1102). Such the feedback information may include the beam pair information and the information on signal strengths of the transmission beams. Here, the beam pair information of the feedback information may be configured as (transmission beam identification information, reception beam identification information). Here, the identification information of the transmission beam may include a TRP ID of the TRP having transmitted the transmission beam and an index of the transmission beam of the TRP. Further, the information on the signal strengths of the transmission beams may include SINRs of the transmission beams. Here, the SINR of the transmission beam may be an SINR of the discovery signal transmitted using the transmission beam. In addition, the identification information of the reception beam may be an index of the reception beam.

On the other hand, the TRP may receive the feedback signals including the feedback information from the terminals. Then, the TRP may obtain the feedback information included in the received feedback signals. As an example, the terminal y may transmit a feedback signal to the TRP w, and the terminal y+1 may transmit feedback signals to the TRP w and the TRP w+1. Accordingly, the TRP w may receive the feedback signal from the terminal y, and the TRP w+1 may receive the feedback signals from the terminal y and the terminal y+1.

Thereafter, the TRP may use the obtained feedback information to generate reception link information including beam pair information for transmission beams used for transmitting signals and reception beam for receiving signals and information on signal strengths of the transmission beams. Here, the reception link information may include beam pair information of transmission beams of each corresponding TRP and reception beams by which signals transmitted through the transmission beams are received, and information on signal strengths of the transmission beams.

The beam pair information of the reception link information may be configured as (transmission beam identification information, reception beam identification information). Here, the identification information of the transmission beam may include a TRP ID of the TRP having transmitted the transmission beam and an index of the transmission beam of the TRP. The identification information of the reception beam may be a terminal ID of the terminal using the reception beam and an index of the reception beam of the terminal. The information on the signal strength of the transmission beam may be an SINR of the transmission beam. Table 2 above may be an example of the reception link information.

On the other hand, the terminal may sequentially or simultaneously transmit feedback signals to the TRPs by using one or more predefined transmission beams. In this case, the terminal may transmit each of the feedback signals by including the terminal ID and the index of the transmission beam used for transmission of each feedback signal.

Accordingly, the TRP may identify the transmission beam by obtaining the terminal ID and the index of the transmission beam of the terminal in each feedback signal. As such, the TRP may receive the feedback signals, which are transmitted by using the transmission beams from the terminal, by using one or more reception beams. Then, the TRP may measure the signal strengths of the feedback signals transmitted using the transmission beams (S1103). In addition, the TRP may obtain the terminal ID and the index of the transmission beam of the terminal for each of the transmission beams used for transmitting the received feedback signals. As one example, the TRP w may measure the received signal strength of the feedback signal by receiving the feedback signal from the terminal y. Also, the TRP w+1 may receive the feedback signals from the terminal y and the terminal y+1, and measure the received signal strengths of the received feedback signals.

Thereafter, each of the TRPs may use the measured signal strengths of the feedback signals to generate feedback link information (i.e., information on a feedback link) including beam pair information for the reception beams of the TRP and transmission beams of the terminal associated therewith and information on signal strengths of the transmission beams. Here, the information on the signal strength of the transmission beam may be information on a signal strength of a feedback signal transmitted using the transmission beam. Here, the feedback link information may include the beam pair information for the transmission beams of the corresponding terminal and the reception beams by which the transmission beams are received, and the information on the signal strength of the transmission beam.

The beam pair information of such the feedback link information may be configured as (transmission beam identification information, reception beam identification information). Here, the identification information of the transmission beam may include a terminal ID of the terminal having transmitted the transmission beam and an index of the transmission beam of the terminal. The identification information of the reception beam may be a TRP ID of the TRP using the reception beam and an index of the reception beam of the TRP. Also, the information on the signal strength of the transmission beam may be an SINR of the transmission beam.

Meanwhile, the TRP may transmit a report signal including the generated reception link information and the feedback link information to the controller (S1104). Then, the controller may receive the report signals including the reception link information and the feedback link information from the TRPs. In addition, the controller may obtain the reception link information and the feedback link information from the received report signals. Thereafter, the controller may generate transmission link information that can be used when the TRPs transmit data to the terminals by using the obtained reception link information and feedback link information.

Here, the transmission link information may include transmission beam pair information for transmission beams to be used by each corresponding TRP to transmit data to each terminal of the TRP and reception beams by which signals transmitted using the transmission beams are received. The transmission beam pair information of such the transmission link information may be configured as (transmission beam identification information, reception beam identification information). Here, the identification information of the transmission beam may include a TRP ID of the TRP having transmitted the transmission beam and an index of the transmission beam of the TRP. The identification information of the reception beam may be a terminal ID of the terminal that is to use the reception beam and an index of the reception beam of the terminal.

Table 3 may show an example of the transmission link information. In this case, as shown in FIG. 12, the controller may determine the slot formats of transmission links in consideration of the received signal strengths of the transmission beams between the TRPs and the received signal strengths of the feedback signals fed back from the terminals.

Figure 12:
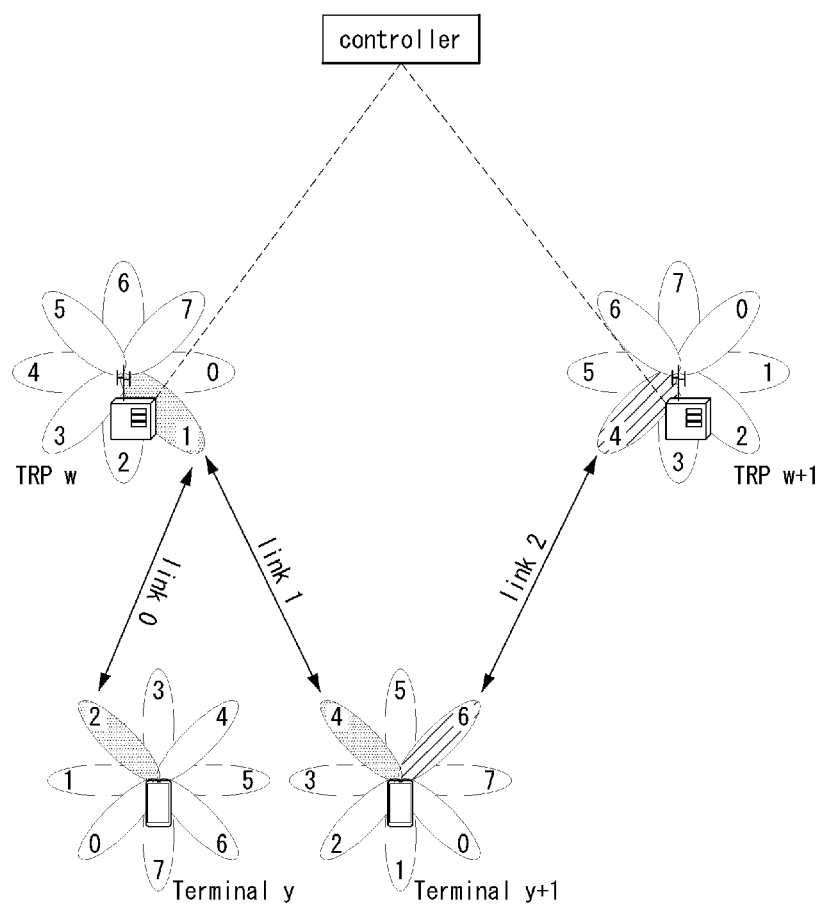
FIG. 12 is a conceptual diagram illustrating a third exemplary embodiment of a signal transmission/reception method for cooperative transmission in a communication system.

FIG. 12 is a conceptual diagram illustrating a third exemplary embodiment of a signal transmission/reception method for cooperative transmission in a communication system.

Referring to FIG. 12, in a signal transmission/reception method for cooperative transmission in a communication system, a link 0 may be established between a beam #1 of the TRP w and a beam #2 of the terminal y. In addition, a link 1 may be established between the beam #1 of the TRP w and a beam #4 of the terminal y+2. In addition, a link 2 may be established between a beam #4 of the TRP w+1 and a beam #6 of the terminal y+1.

Meanwhile, Table 7 may show an example of possible combinations of DL and UL for the exemplary embodiment of FIG. 12. The links 0 and 1 may simultaneously use a beam of the TRP w having a beam index of 1. In this reason, referring to Table 7, they may need to have the same transmission direction. Accordingly, in the cases 4, 5, 6, 10, 11, and 12 of Table 7, which are cases where the links 0 and 1 have different transmission directions, simultaneous transmission and reception may not be possible.

In addition, the beam #1 of the TRP w and the beam #4 of the TRP w+1 may have severe interference, and thus they may not have different transmission directions. Accordingly, in the cases 2, 13, 20, and 22 of Table 7, which are cases where the beam #1 of the TRP w and the beam #4 of the TRP w+1 have different transmission directions, simultaneous transmission and reception may not be possible. However, the cases 8 and 16, which are cases where transmission and reception can be simultaneously performed in the links 0 and 2, may operate in the dynamic TDD scheme.

TABLE 7

| case | link 0 {w, 1, y, 2}) | link 1 {w, 1, y + 1, 4} | link 2 {w + 1, 4, y + 1, 6} | usable (○, X) | (○, X) |
|---|---|---|---|---|---|
| 1 | DL | DL | DL | ○ | |
| 2 | DL | DL | UL | X | |
| 3 | DL | DL | Not used | ○ | |
| 4 | DL | UL | DL | X | |
| 5 | DL | UL | UL | X | |
| 6 | DL | UL | Not used | X | |
| 7 | DL | Not used | DL | ○ | |
| 8 | DL | Not used | UL | ○ | (dynamic TDD possible) |
| 9 | DL | Not used | Not used | ○ | |
| 10 | UL | DL | DL | X | |
| 11 | UL | DL | UL | X | |
| 12 | UL | DL | Not used | X | |
| 13 | UL | UL | DL | X | |
| 14 | UL | UL | UL | ○ | |
| 15 | UL | UL | Not used | ○ | |
| 16 | UL | Not used | DL | ○ | (dynamic TDD possible) |
| 17 | UL | Not used | UL | ○ | |
| 18 | UL | Not used | Not used | ○ | |
| 19 | Not used | DL | DL | ○ | |
| 20 | Not used | DL | UL | X | |
| 21 | Not used | DL | Not used | ○ | |
| 22 | Not used | UL | DL | X | |
| 23 | Not used | UL | UL | ○ | |
| 24 | Not used | UL | Not used | ○ | |
| 25 | Not used | Not used | DL | ○ | |
| 26 | Not used | Not used | UL | ○ | |
| 27 | Not used | Not used | Not used | — | |

Referring again to FIG. 11, the controller may generate control signals including transmission link information in which transmission directions of symbols are designated, and transmit the generated control signals to the TRPs (S1105). Then, the TRPs may receive, from the controller, the control signals including the transmission link information in which the transmission directions of the symbols are designated.

In addition, the TRPs may obtain the transmission link information in which the transmission directions of symbols are designated from the received control signals. Accordingly, the TRPs may transmit data in accordance with the transmission directions of the symbols by using the transmission links according to the transmission link information in which the transmission direction of the symbols are designated, so that the transmission directions of the symbols are matched. That is, when transmitting the data to the terminals, the TRPs may generate data transmission signals including data to be transmitted.

In addition, the TRPs may transmit the generated data transmission signals to the terminals through symbols having downlink transmission directions according to the transmission link information by using the transmission beams (S1106). Here, when the number of transmission beams in the transmission link information is two or more, the TRPs may simultaneously or sequentially transmit the transmission beams to reduce an error probability through a spatial diversity gain. The terminal may receive the data transmission signals including the data from the TRPs. Then, the terminal may obtain the data from the data transmission signals. In this case, the terminal may not use all reception beams and may consider SINR values fed back through uplink in order to reduce power consumption and hardware complexity.

Accordingly, the terminal may receive the data transmission signals by using only reception beams corresponding to transmission beams expected to be transmitted by the TRPs, and obtain the data. On the other hand, the terminal may transmit the data signals to the TRPs. In addition, the TRP may receive the data signals from the terminal by using reception beams through symbols having uplink transmission directions according to the transmission link information. Then, the TRP may obtain the data from the received data signals.

On the other hand, the terminal may transmit signals to the TRPs. Then, the TRP may measure signal strengths of the signals received from the terminal by using the same reception beam of the TRP in order to mitigate inter-terminal interference in the dynamic TDD scheme. In addition, the TRP may determine whether to use the link based on the measured signal strengths of the received signals, and determine whether to use the link for DL or UL based on the measured signal strengths of the received signals.

The second and third exemplary embodiments described above may be used individually or in combination.

Figure 13:
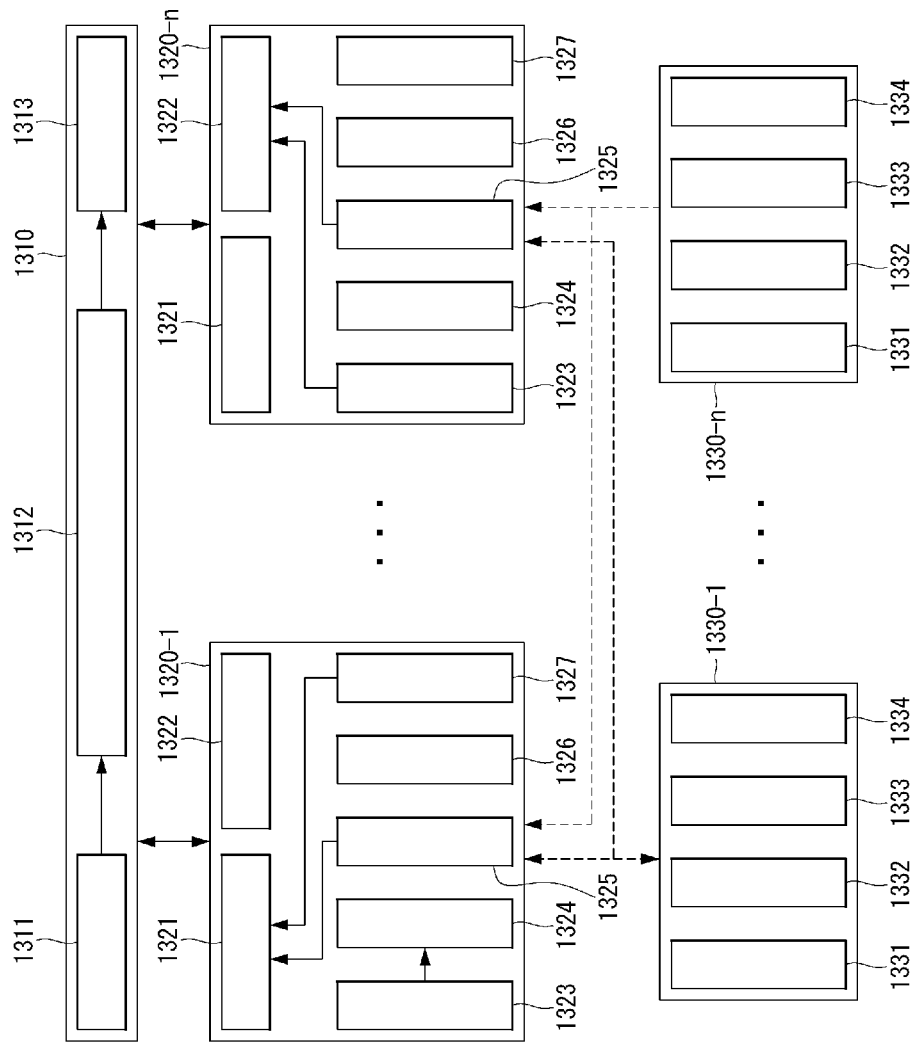
FIG. 13 is a block diagram illustrating a second exemplary embodiment of a C-RAN structure.

FIG. 13 is a block diagram illustrating a second exemplary embodiment of a C-RAN structure.

Referring to FIG. 13, a C-RAN structure may include a controller 1310, TRPs 1320-1 to 1320-n, and terminals 1330-1 to 1330-n. In addition, the controller 1310 may include a receiver 1311 of receiving link information, a determiner 1312 of determining availability of a link for transmission and reception and a transmission direction of the link, and a transmitter 1313 of transmitting the determined link information. Each of the TRPs 1320-1 to 1320-n may include a generator 1321 of generating link information, a receiver 1322 of receiving determined link information, a receiver 1323 of receiving UL control channels and UL data channels, a transmitter 1324 of transmitting DL control channels and DL data channels, a receiver 1325 of receiving feedback signals, a transmitter 1326 of transmitting a predefined beam pattern and control information, and a receiver 1327 of receiving a predefined beam pattern and control information. In addition, each of the terminals 1330-1 to 1330-n may include a transmitter 1331 of transmitting UL control channels and UL data channels, a receiver 1332 of receiving DL control channels and DL data channels, a transmitter 1333 of transmitting feedback signals, and a receiver 1334 of receiving a predefined beam pattern and control information.

In the above-described configuration, the transmitters 1326 of the TRPs 1320-1 to 1320-n may transmit beam-related control information to the terminals 1330-1 to 1330-n and the adjacent TRPs 1320-1 to 1320-n in a predetermined beam pattern. Then, the receivers 1334 of the terminals 1330-1 to 1330-n may receive the beam-related control information from the TRPs 1320-1 to 1320-n.

In addition, the receivers 1323 of the adjacent TRPs 1320-1 to 1320-n may receive the beam-related control information from the TRPs 1320-1 to 1320-n. Thereafter, the transmitters 1333 of the terminals 1330-1 to 1330-n may generate feedback information including beam indexes and SINRs of the TRPs and transmit feedback signals including the generated feedback information to the TRPs 1320-1 to 1320-n. Accordingly, the receivers 1325 of the TRPs 1320-1 to 1320-n may receive the feedback signals from the terminals 1330-1 to 1330-n.

On the other hand, the TRPs 1320-1 to 1320-n may generate reception link information by using the feedback information received from the terminals 1330-1 to 1330-n, and transmit, to the controller 1310, the generated reception link information and adjacent link information according to the control information received from the adjacent TRPs 1320-1 to 1320-n. Accordingly, the receiver 1311 of the controller 1310 may receive the adjacent link information and the reception link information from the TRPs 1320-1 to 1320-n.

In addition, the determiner 1312 of the controller 1310 may determine available links and transmission directions of the respective links by using the link information received from the TRPs 1320-1 to 1320-n. Thereafter, the transmitter 1333 of the controller 1310 may transmit the determined transmission link information to the TRPs 1320-1 to 1320-n. The receivers of the TRPs 1320-1 to 1320-n may receive the link information from the controller 1310. The transmitters 1324 of the TRPs 1320-1 to 1320-n may transmit the received determined link information to the terminals 1330-1 to 1330-n.

Accordingly, the receivers 1332 of the terminals 1330-1 to 1330-n may receive DL control channels and DL data channels from the TRPs 1320-1 to 1320-n. On the other hand, the transmitters 1331 of the terminals 1330-1 to 1330-n may transmit UL control channels and UL data channels to the TRPs 1320-1 to 1320-n. Accordingly, the receivers 1323 of the TRPs 1320-1 to 1320-n may receive the UL control channels and the UL data channels from the terminals 1330-1 to 1330-n.

The present disclosure relates to methods and apparatuses for transmission among terminals and a plurality of TRPs physically separated in the UDN environment. According to the present disclosure as described above, the communication system can increase the capacity of the system by flexibly changing the DL/UL switching position for each TRP without increasing interference, and can reduce the transmission delay compared to the static TDD scheme.

In addition, according to the present disclosure, since the communication system does not require calibration, wired/wireless resources and complicated implementation necessary for the calibration may not be required. In addition, according to the present disclosure, by transferring only the beam indexes and SINR information between the controller and the TRPs, it is made possible to reduce the network configuration cost by reducing the need for a large-capacity wired/wireless resource for transmitting radio channel information between the TRPs and the terminals.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method performed by a transmission/reception point (TRP) in a communication system, the operation method comprising:
    transmitting, to a terminal, a first discovery signal including an identifier of a first transmission beam by using the first transmission beam;
    transmitting, to the terminal, a second discovery signal including an identifier of a second transmission beam by using the second transmission beam;
    transmitting, to the terminal, a third discovery signal including an identifier of a third transmission beam by using the third transmission beam;
    receiving, from the terminal, first beam pair information including an identifier of a first reception beam used for receiving the first discovery signal and the identifier of the first transmission beam, and first received signal strength information of the first transmission beam;
    receiving, from the terminal, second beam pair information including an identifier of a second reception beam used for receiving the second discovery signal and the identifier of the second transmission beam, and second received signal strength information of the second transmission beam;
    receiving, from the terminal, third beam pair information including an identifier of a third reception beam used for receiving the third discovery signal and the identifier of the third transmission beam, and third received signal strength information of the third transmission beam;
    transmitting, to a controller, the first beam pair information, the second beam pair information, the third beam pair information, the first received signal strength information, the second received signal strength information, and the third received signal strength information;
    receiving, from the controller, information on a first transmission beam pair selected from the first beam pair information, and the second beam pair information and the third beam pair information based on the first received signal strength information, the second received signal strength information and the third received signal strength information; and transmitting data to the terminal by using a transmission beam according to the information on the first transmission beam pair, wherein the identifier of the first transmission beam includes a TRP identifier (ID) of the TRP and an index of the first transmission beam, the identifier of the second transmission beam includes the TRP ID of the TRP and an index of the second transmission beam, the identifier of the third transmission beam includes the TRP ID of the TRP and an index of the third transmission beam, the identifier of the first reception beam includes a terminal ID of the terminal and an index of the first reception beam, the identifier of the second reception beam includes the terminal ID of the terminal and an index of the second reception beam, and the identifier of the third reception beam includes the terminal ID of the terminal and an index of the third reception beam.

2. The operation method according to claim 1, further comprising:

receiving, from another adjacent TRP, a fourth discovery signal including an identifier of a fourth transmission beam by using a fourth reception beam;

obtaining fourth received signal strength information of the fourth discovery signal;

transmitting, to the controller, fourth beam pair information including the identifier of the fourth transmission beam and an identifier of the fourth reception beam and the fourth received signal strength information;

receiving, from the controller, information on a second transmission beam pair selected from the first beam pair information, the second beam pair information, and the third beam pair information based on the first received signal strength information, the second received signal strength information, the fourth received signal strength information, the third received signal strength information and the fourth beam pair information; and transmitting data to the terminal by using a transmission beam according to the second transmission beam pair.

3. The operation method according to claim 2, wherein the information on the second transmission beam pair further includes information on transmission directions of symbols, and in the transmitting of the data to the terminal by using the transmission beam according to the second transmission beam pair, the data is transmitted to the terminal by using the transmission beam according to the second transmission beam pair according to the information on the transmission directions of symbols.

4. The operation method according to claim 1, further comprising:

receiving, from the terminal, a feedback signal comprising an identifier of a fourth fifth transmission beam by using a fifth reception beam;

obtaining fifth received signal strength information of the feedback signal;

transmitting, to the controller, fifth beam pair information including the identifier of the fifth transmission beam and an identifier of the fifth reception beam and the fifth received signal strength information;

receiving, from the controller, information on a third transmission beam pair selected from the first beam pair information, the second beam pair information, and the third beam pair information based on the first received signal strength information, the second received signal strength information, the third received signal strength information, the fifth received signal strength information, and the fifth beam pair information; and transmitting data to the terminal by using a transmission beam according to the third transmission beam pair.

5. An operation method performed by a terminal in a communication system, the operation method comprising:

receiving, from a transmission/reception point (TRP), a first discovery signal including an identifier of a first transmission beam by using a first reception beam;

measuring a first received signal strength of the first discovery signal;

receiving, from the TRP, a second discovery signal including an identifier of a second transmission beam by using a second reception beam;

measuring a second received signal strength of the second discovery signal;

receiving, from the TRP, a third discovery signal including an identifier of a third transmission beam by using a third reception beam;

measuring a third received signal strength of the third discovery signal;

transmitting, to the TRP, first beam pair information including the identifier of the first transmission beam and an identifier of the first reception and the first received signal strength information;

transmitting, to the TRP, second beam pair information including the identifier of the second transmission beam and an identifier of the second reception beam and the second received signal strength information; and transmitting, to the TRP, third beam pair information including the identifier of the third transmission beam and an identifier of the third reception beam and the third received signal strength information, wherein the identifier of the first transmission beam includes a TRP identifier (ID) of the TRP and an index of the first transmission beam, the identifier of the second transmission beam includes the TRP ID of the TRP and an index of the second transmission beam, the identifier of the third transmission beam includes the TRP ID of the TRP and an index of the third transmission beam, the identifier of the first reception beam includes a terminal ID of the terminal and an index of the first reception beam, the identifier of the second reception beam includes the terminal ID of the terminal and an index of the second reception beam, and the identifier of the third reception beam includes the terminal ID of the terminal and an index of the third reception beam.

6. The operation method according to claim 5, further comprising receiving, from the TRP, data transmitted by using a transmission beam according to information on a first transmission beam pair selected from the first beam pair information, and the second beam pair information and the third beam pair information based on the first received signal strength information, the second received signal strength information and the third received signal strength information.

7. The operation method according to claim 5, further comprising:

transmitting, to the TRP, a feedback signal including an identifier of a fourth transmission beam; and receiving, from the TRP, data transmitted by using a transmission beam according to a second transmission beam pair selected from the first beam pair information, the second beam pair information and the second beam pair information based on the first received signal strength information, the second received signal strength information, the third received signal strength information and fourth received signal strength information of the feedback signal.

8. A terminal comprising:

a processor;

a memory electronically communicating with the processor; and instructions stored in the memory, wherein when executed by the processor, the instructions cause the terminal to:

receive, from a transmission/reception point (TRP), a first discovery signal including an identifier of a first transmission beam by using a first reception beam;

measure a first received signal strength of the first discovery signal;

receive, from the TRP, a second discovery signal including an identifier of a second transmission beam by using a second reception beam;

measure a second received signal strength of the second discovery signal;

receive, from the TRP, a third discovery signal including an identifier of a third transmission beam by using a third reception beam;

measure a third received signal strength of the third discovery signal;

transmit, to the TRP, first beam pair information including the identifier of the first transmission beam and an identifier of the first reception and the first received signal strength information;

transmit, to the TRP, second beam pair information including the identifier of the second transmission beam and an identifier of the second reception beam and the second received signal strength information; and transmit, to the TRP, third beam pair information including the identifier of the third transmission beam and an identifier of the third reception beam and the third received signal strength information, wherein the identifier of the first transmission beam includes a TRP identifier (ID) of the TRP and an index of the first transmission beam, the identifier of the second transmission beam includes the TRP ID of the TRP and an index of the second transmission beam, the identifier of the third transmission beam includes the TRP ID of the TRP and an index of the third transmission beam, the identifier of the first reception beam includes a terminal ID of the terminal and an index of the first reception beam, the identifier of the second reception beam includes the terminal ID of the terminal and an index of the second reception beam, and the identifier of the third reception beam includes the terminal ID of the terminal and an index of the third reception beam.

9. The terminal according to claim 8, wherein the instructions cause the terminal to: receive, from the TRP, data transmitted by using a transmission beam according to information on a first transmission beam pair selected from the first beam pair information, the second beam pair information and the third beam pair information based on the first received signal strength information, the second received signal strength information and the third received signal strength information.

10. The terminal according to claim 8, wherein the instructions cause the terminal to:

transmit, to the TRP, a feedback signal including an identifier of a fourth transmission beam; and receive, from the TRP, data transmitted by using a transmission beam according to a second transmission beam pair selected from the first beam pair information, and the second beam pair information and the second beam pair information based on the first received signal strength information, the second received signal strength information, the third received signal strength information and fourth received signal strength information of the feedback signal.

* * * * *